(12) United States Patent
Jessie, Jr.

(10) Patent No.: US 8,517,403 B2
(45) Date of Patent: Aug. 27, 2013

(54) CONVERTIBLE CHILD VEHICLE

(75) Inventor: Donald K. Jessie, Jr., Middletown, OH (US)

(73) Assignee: Huffy Corporation, Centerville, OH (US)

( * ) Notice: Subject to any disclaimer, the term of this patent is extended or adjusted under 35 U.S.C. 154(b) by 621 days.

(21) Appl. No.: 12/706,611

(22) Filed: Feb. 16, 2010

(65) Prior Publication Data
US 2011/0198819 A1    Aug. 18, 2011

(51) Int. Cl.
*B62M 1/00*    (2010.01)
(52) U.S. Cl.
USPC ............... 280/87.041; 280/7.1; 280/87.021
(58) Field of Classification Search
USPC .............. 280/827, 828, 1.13, 1.188, 1.189,
280/7.1, 7.15, 7.16, 29, 200, 400, 401, 415.1,
280/638, 639, 87.01, 87.021, 87.03, 87.041,
280/87.05, 87.051, 47.17, 47.18, 47.25, 47.38,
280/47.34, 30, 643; D21/419, 421, 422,
D21/423, 424, 426; 297/5, 6
See application file for complete search history.

(56) References Cited

U.S. PATENT DOCUMENTS

| | | | |
|---|---|---|---|
| 1,328,557 A | 1/1920 | Brauer | |
| 1,498,427 A | 6/1924 | Dean | |
| 1,872,289 A | 8/1932 | Hester | |
| 2,006,420 A | 7/1935 | Thompson | |
| D230,619 S | 3/1974 | Campbell et al. | |
| 4,095,816 A | 6/1978 | Langieri | |
| 4,346,908 A | 8/1982 | Kassai | |
| 4,958,842 A * | 9/1990 | Chang | 280/7.1 |
| D337,973 S | 8/1993 | Mariol | |
| 5,362,272 A | 11/1994 | Chow et al. | |
| 5,441,289 A | 8/1995 | Spielberger | |
| 5,813,720 A | 9/1998 | Huang | |
| 5,845,963 A | 12/1998 | Huang | |
| D424,126 S | 5/2000 | Goes et al. | |
| 6,089,586 A | 7/2000 | Rudell et al. | |
| 6,206,384 B1 * | 3/2001 | Chi et al. | 280/30 |

(Continued)

FOREIGN PATENT DOCUMENTS

EP     1 419 960     5/2004

OTHER PUBLICATIONS

Mark A. Laipple; Declaration of Mark A. Laipple; Aug. 13, 2010; 3 pages.

(Continued)

*Primary Examiner* — John Walters
*Assistant Examiner* — Brian Swenson
(74) *Attorney, Agent, or Firm* — Wood, Herron & Evans, LLP

(57) ABSTRACT

A child vehicle includes a front portion having a front wheel and a first handlebar configured to steer the vehicle, and a rear portion coupled to the front portion and having a rear wheel. The front portion is capable of rotating relative to the rear portion about a first pivot axis. A pivot member is coupled to the vehicle and rotatable about a second pivot axis between a first position and a second position. In the first position, the pivot member operates as a seat for supporting a rider thereon to define a ride-on configuration. In the second position, the pivot member operates as a second handlebar to define a scooter configuration. The second handlebar is also configured to steer the vehicle when in the scooter configuration. The vehicle may include a graphical interface for decorating or otherwise marking the vehicle in a manner preferred by the child.

19 Claims, 10 Drawing Sheets

(56) References Cited

U.S. PATENT DOCUMENTS

| | | |
|---|---|---|
| 6,296,268 B1 | 10/2001 | Ford et al. |
| 6,446,981 B1 | 9/2002 | Wise et al. |
| 6,695,327 B1 | 2/2004 | Maggiore et al. |
| 6,863,287 B2 | 3/2005 | Myers et al. |
| 7,055,841 B2 | 6/2006 | Buhrman |
| 7,159,882 B2 | 1/2007 | Buhrman |
| 7,347,432 B2 | 3/2008 | Myers et al. |
| 7,455,308 B2 | 11/2008 | Michelau et al. |
| D589,851 S | 4/2009 | Jane Santamaria |
| 2002/0000702 A1 | 1/2002 | Charron |
| 2002/0017773 A1* | 2/2002 | Chow .................. 280/639 |
| 2008/0179850 A1 | 7/2008 | Catelli |
| 2009/0094868 A1* | 4/2009 | Soll et al. ............. 40/299.01 |
| 2009/0160150 A1* | 6/2009 | Johnson ............... 280/87.041 |

OTHER PUBLICATIONS

Huffy Corporation, Slides 14 and 15 from presentation given to Utensil Manufacturer in Oct. 2007.

Huffy Corporation, Slides 8 and 9 from presentation given to Retailers beginning in Jan. 2008.

\* cited by examiner

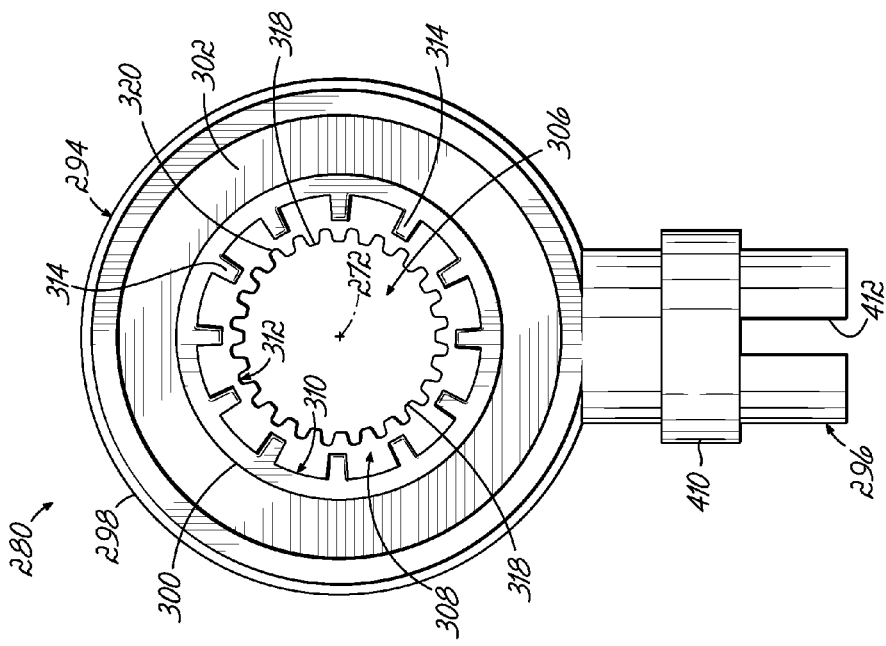
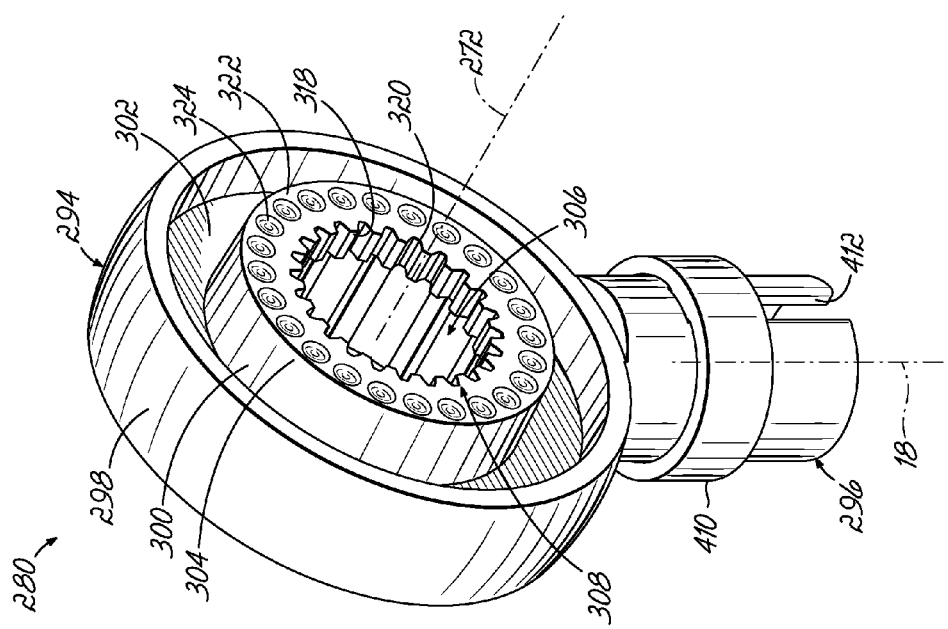

CONVERTIBLE CHILD VEHICLE

TECHNICAL FIELD

The invention relates generally to a convertible scoot-a-bout vehicle for children, and more particularly to a scoot-a-bout capable of converting between two configurations and capable of being steered in either configuration. The invention also relates generally to personalizing the scoot-a-bout and providing additional activities for a child using the scoot-a-bout.

BACKGROUND

Various ride-on vehicles are among the most popular items for children. These ride-on vehicles provide a seat to support the rider yet allow their feet to contact the ground so as to push or pull the vehicle in a desired direction through a scooting action of their feet. Another popular item with children that relies on contact of the rider's feet with the ground and a scooting action thereof to move the vehicle is a scooter. Conventionally, if a child wanted both a ride-on toy and a scooter, the child's parents or guardian would typically purchase two separate products. However, the purchase of two separate scoot-a-bout types of vehicles may be costly. Additionally, two separate products increase the space required for storage, which may be at a premium in a garage, basement or other storage location.

More recently, some ride-on vehicles have been offered that provide a conversion between a ride-on configuration and a scooter configuration. However, such convertible designs also have their drawbacks. A primary drawback, for example, involves the lack of steering control in one or both of the configurations. By way of example, when these convertible vehicles are in the scooter configuration, the rider is typically unable to steer the vehicle, thereby limiting the direction of the rider to only a single direction (e.g., straight ahead). Such a limitation may diminish the excitement and enjoyment experienced by the rider during use.

In addition to the above, manufacturers strive to provide products that capture the attention and imagination of children and make the product more enjoyable during play. Many products on the market currently lack new and exciting features that allow children to play in different and interesting ways. For example, many products are provided to children with predetermined color schemes or decorative features (e.g., decals, etc.), which oftentimes fail to make a personal connection with the child. Additionally, many products offered today provide limited activities for children, often being limited to a single activity (e.g., a tricycle is only used to ride). Such products, while being generally successful for their intended purpose, may limit the use or diminish the enjoyment the child may gain from using the product.

Thus, there remains a need for an improved scoot-a-bout vehicle that is capable of converting between multiple configurations in a manner that allows the rider to maintain steering control of the vehicle. There also remains a need for a child vehicle designed to make a personal connection with the child and provide a variety of activities for the child.

SUMMARY

To address these and other shortcomings, a child vehicle is disclosed herein including a front portion having at least one front wheel coupled thereto and a first handlebar operatively configured to change the direction of the at least one wheel, and a rear portion coupled to the front portion and having at least one rear wheel coupled thereto. The front portion is capable of rotating relative to the rear portion about a first pivot axis. A pivot joint is coupled to the vehicle and a pivot member is coupled to the pivot joint. The pivot joint is operatively configured to provide rotation of the pivot member between at least a first position and a second position about a second pivot axis. In the first position, the pivot member operates as a seat for supporting a rider thereon to define a ride-on configuration of the vehicle. In the second position, the pivot member operates as a handlebar configured to be grasped by the rider to define a scooter configuration of the vehicle.

In one embodiment, the pivot joint is a push-button type of joint. Additionally, the first and second pivot axes may be arranged to be generally orthogonal to each other and intersect each other. The pivot joint may also be coupled to the vehicle so as to be capable of rotating about the first pivot axis. The pivot member may include a compartment for storing various items. For example, the pivot member may include a main body member coupled to the pivot joint and defining the compartment therein, and a lid member coupled to the pivot joint and rotatable relative to the main body between open and closed positions.

In another embodiment, a child vehicle includes a front portion having at least one front wheel coupled thereto and a rear portion coupled to the front portion and having at least one rear wheel coupled thereto. The front portion is capable of rotating relative to the rear portion about a first pivot axis. A pivot joint is coupled to the vehicle so as to be rotatable about the first pivot axis and a pivot member is coupled to the pivot joint. The pivot joint is operatively configured to provide rotation of the pivot member relative to the vehicle about a second pivot axis to define at least a first position and a second position thereof. A first handlebar is coupled to the front portion of the vehicle and operatively configured to change the direction of the at least one front wheel. A second handlebar is coupled to the pivot member and is operatively configured to change the direction of the at least one front wheel when the pivot member is in the second position, and is operatively ineffective to change the direction of the at least one front wheel when the pivot member is in the first position. In this regard, in one embodiment, the front portion includes a recess having a first shape and the pivot member includes a projection having a shape corresponding to the first shape. When the pivot member is in the second position, the projection engages the recess such that rotation of the pivot member about the first pivot axis causes a corresponding rotation of the front portion of the vehicle relative to the rear portion about the first pivot axis.

In still a further embodiment, a child vehicle includes a front portion having at least one front wheel coupled thereto and a rear portion coupled to the front portion and having at least one rear wheel coupled thereto. The front portion is capable of rotating relative to the rear portion about a first pivot axis. A pivot member is coupled to the vehicle so as to be rotatable about a second pivot axis between at least a first position and a second position. In the first position, the pivot member operates as a seat for supporting a rider thereon to define a ride-on configuration of the vehicle. In the second position, the pivot member operates as a handlebar to define a scooter configuration of the vehicle. The vehicle further includes at least one graphical interface coupled thereto and configured to be marked on with a marking utensil. The graphical interface may be integrally formed on an exposed surface of the vehicle and may, for example, include a surface of an art board surface or a surface having sufficient surface roughness. Alternatively, a substrate may be removably coupled to the vehicle wherein the substrate defines the graphical interface.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 8A is a perspective view of a member of the pivot joint;

FIG. 8B is a side view of the member shown in FIG. 8A;

DETAILED DESCRIPTION

Figure 1:
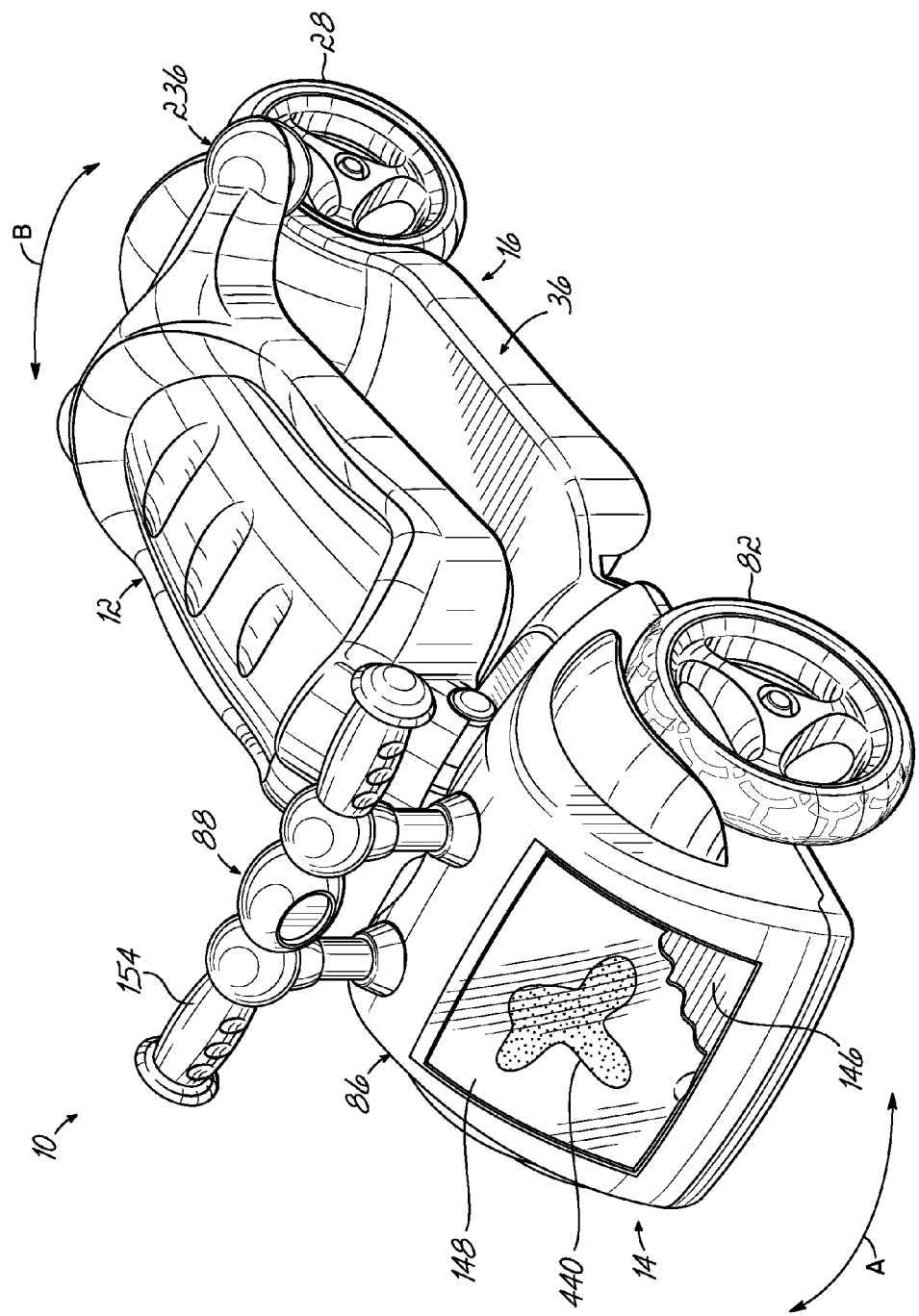
FIG. 1 is a perspective view of a scoot-a-bout in accordance with an embodiment of the invention shown in a ride-on configuration.
Figure 2:
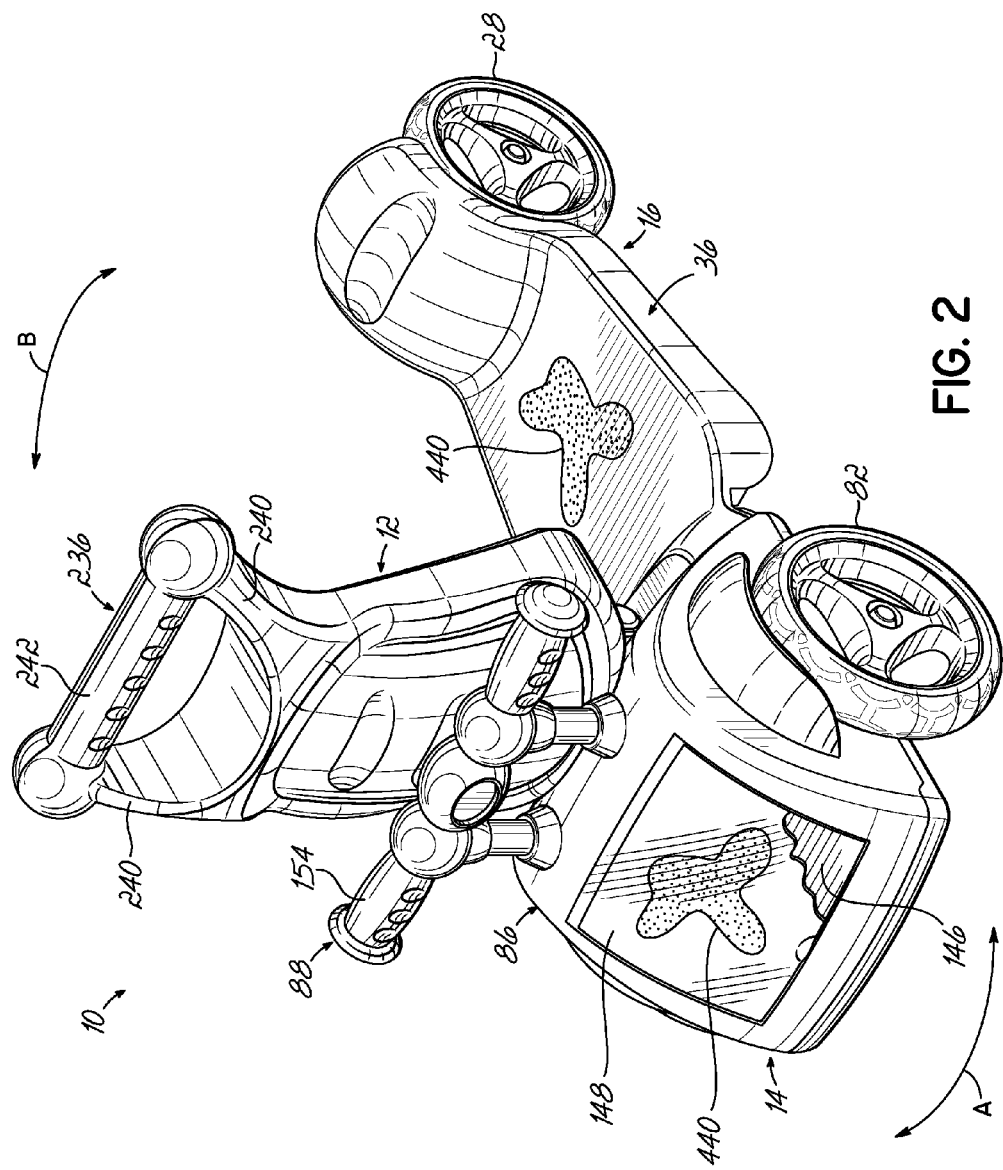
FIG. 2 is a perspective view of the scoot-a-bout shown in FIG. 1 shown in a scooter configuration.

Referring now to the drawings and to FIGS. 1 and 2 in particular, a scoot-a-bout 10 in accordance with an exemplary embodiment of the invention is shown. The scoot-a-bout 10 is configured such that a rider (not shown) is capable of contacting the ground to provide a motive force that moves the scoot-a-bout in a desired direction. More particularly, one or more of the rider's feet is configured to contact the ground such that the scoot-a-bout 10 may be moved through a scooting action of the rider's feet. As shown in these figures and as discussed in more detail below, in one aspect, the scoot-a-bout 10 is convertible between a ride-on configuration, as shown in FIG. 1, and a scooter configuration, as shown in FIG. 2. To this end, the scoot-a-bout 10 includes a pivot member 12 that when in the ride-on configuration (FIG. 1) operates as a seat for supporting the rider in a seated position, and when in the scooter configuration (FIG. 2), the pivot member 12 is pivoted to an upright position and operates as a steering assembly for the scoot-a-bout 10. In a second aspect, in both the ride-on configuration and the scooter configuration, the scoot-a-bout 10 is capable of being steered by the rider.

Figure 3:
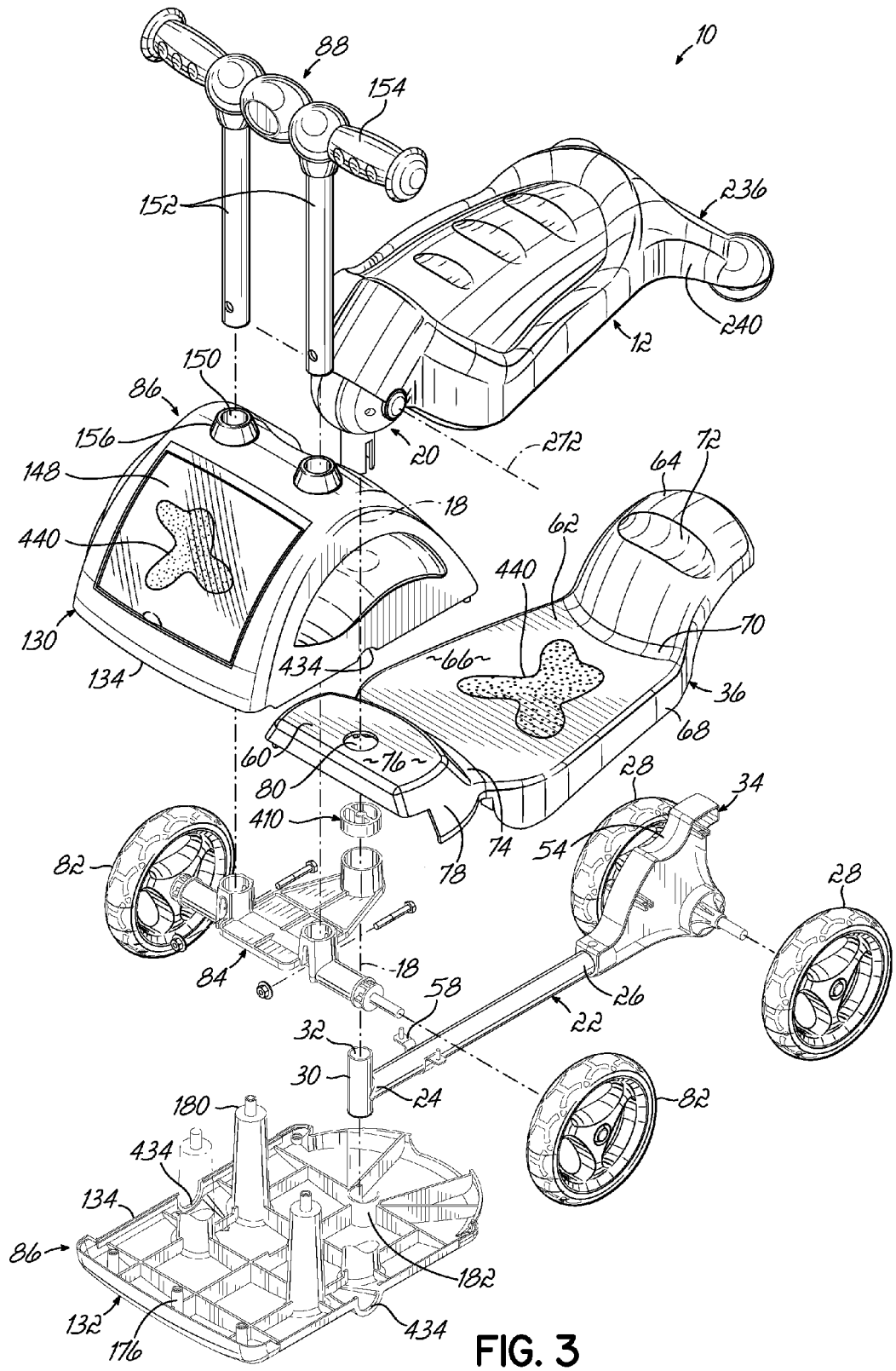
FIG. 3 is a disassembled perspective view of the scoot-a-bout shown in FIGS. 1 and 2.

The scoot-a-bout 10 includes a front portion 14 and a rear portion 16 that are capable of rotating relative to each other about a first pivot axis 18 (FIG. 3) defined at least in part by a pivot joint 20 (FIG. 3) at the juncture of the front and rear portions 14, 16. As illustrated in FIG. 3, the rear portion 16 has a support frame for supporting the weight of the rider and, in one embodiment, includes a generally elongate member 22. The elongate member 22 may, for example, include one or more generally tubular members (one shown) having sufficient strength to support the weight of the rider. The elongate member 22 includes a first end 24 configured to be coupled to the front portion 14 and a second end 26 configured to be coupled to a pair of rear wheels 28. In one embodiment, the first end 24 includes a head tube 30 that defines a passageway 32 which extends in a direction generally parallel to first pivot axis 18 when the scoot-a-bout 10 is assembled. The head tube 30 may be coupled to elongate member 22 through a welding or bonding process, for example, so as to form a generally T-shaped configuration, as shown in FIG. 3. In one embodiment, the elongate member 22 and head tube 30 may be formed from metal, such as stainless steel or aluminum tubing. However, these structural elements may be formed from other suitable materials, including various engineering plastics.

Figure 4A:
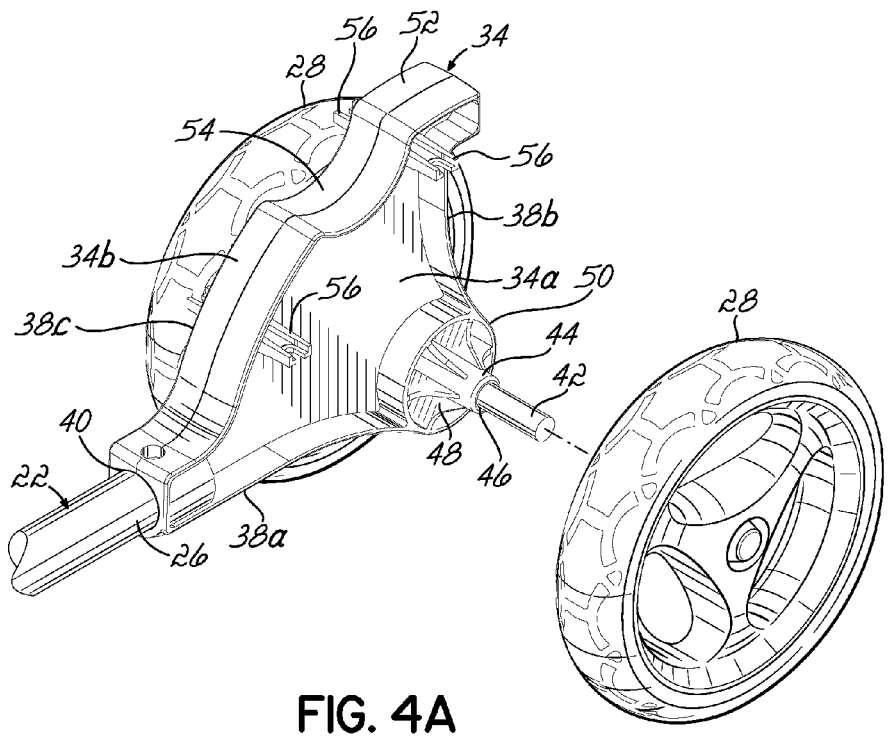
FIG. 4A is a partially disassembled perspective view of a rear portion of the scoot-a-bout shown in FIGS. 1 and 2.

The support frame of rear portion 16 may further include a rear frame member 34 that is configured to support the rear wheels 28 of the scoot-a-bout 10 and, as discussed in more detail below, is configured to support a deck 36 coupled to rear portion 16. As best shown in FIG. 4A, the rear frame member 34 may be formed from two plates or halves 34a, 34b that are mated together to form member 34. By way of example, each half 34a, 34b may be molded plastic components that are formed separately and subsequently adhesively bonded or otherwise coupled together. In one embodiment, the rear frame member 34 has a generally triangular shape having a lower side 38a, a rear side 38b, and a generally upper side 38c. The corner between the lower side 38a and upper side 38c includes a bore 40 configured to snugly receive the second end 26 of elongate member 22. In one embodiment, a suitable fastener, such as a screw, rivet, etc. may be used to couple elongate member 22 with rear frame member 34. Other types of fasteners may also be used.

The corner between the lower side 38a and the rear side 38b may be configured to receive and support a rear axle 42 to which rear wheels 28 are coupled. In this regard, each of the halves 38a, 38b may include an outwardly extending, tubular axle support member 44 that collectively defines a passageway 46 for receiving the axle 42 therethrough. The rear frame member 34 may include additional support features, including ribs 48 and surrounding wall 50, to support axle 42 within rear frame member 34. The corner between the rear side 38b and the upper side 38c may include an abutment 52 for at least in part supporting the deck 36 or rear frame member 34. Moreover, the upper side 38c of rear frame member 34 may be generally arcuate and may include a U-shaped depression 54 formed in the surface thereof. The upper side 38c is shaped to correspond to the shape of the deck 36, as explained in more detail below, to support the deck 36 on the support frame of rear portion 16. In this regard, the rear frame member 34 may include one or more flanges 56 configured to receive a suitable fastener (e.g., screw, rivet, etc.) for securing the deck 36 thereto.

As shown in FIG. 3, the deck 36 may be configured to be coupled to the support frame of the rear portion 16 of the scoot-a-bout 10. In this regard, the underside of deck 36 may include a plurality of bosses having threaded bores (not shown) configured to receive suitable fasteners for securing the deck 36 to the support frame, such as via flanges 56 and/or one or more clips 58 positioned along elongate member 22. In one embodiment, the deck 36 generally includes a head portion 60, and intermediate body portion 62, and a fender portion 64. The deck 36 may have a one-piece integral construction formed, for example, through a molding process using suitable plastic materials. The invention, however, is not so limited as the deck 36 may be formed from separate pieces and/or formed through a variety of other processes or other materials. When the deck 36 is coupled to the support frame of the rear portion 16, the head portion 60 generally overlies the head tube 30, the intermediate body portion 62 generally overlies the elongate member 22, and the fender portion 64 generally overlies rear frame member 34.

The intermediate body portion 62 includes a generally planar upper surface 66 and opposed, generally downturned sides 68 thereof. As illustrated in FIG. 2, the upper surface 66 of deck 36 is configured to receive at least one foot (and possibly both feet) of a rider when the scoot-a-bout 10 is in the scooter configuration. The fender portion 64 of deck 36 extends upwardly and rearwardly of a second end 70 of the intermediate body portion 62 in a generally arcuate manner. At least a portion of the underside surface (not shown) of fender portion 64 has a shape that generally corresponds to the shape of the upper side 38c of rear frame member 34 such that they engage therealong. In this regard, as illustrated in FIG. 3, fender portion 64 includes a generally U-shaped depression 72 that is in registration with the depression 54 formed in the upper side 38c of rear frame member 34 when the scoot-a-bout 10 is assembled. The purpose of the depression 72 in fender portion 64 will be described in more detail below.

The head portion 60 of deck 36 extends upwardly and forward of a first end 74 of intermediate body portion 62 and includes a generally planar upper surface 76 raised above upper surface 66 of intermediate body portion 62, and a conically-shaped side surface 78, at least a portion of which couples to the intermediate body portion 62 along its first end 74. As shown in FIG. 3, the upper surface 76 of head portion 60 includes an opening or aperture 80 configured to align with the passageway 32 in head tube 30 (e.g., is coaxially disposed about first pivot axis 18) when the deck 36 is coupled to the support frame of the rear portion 16.

Figure 4B:
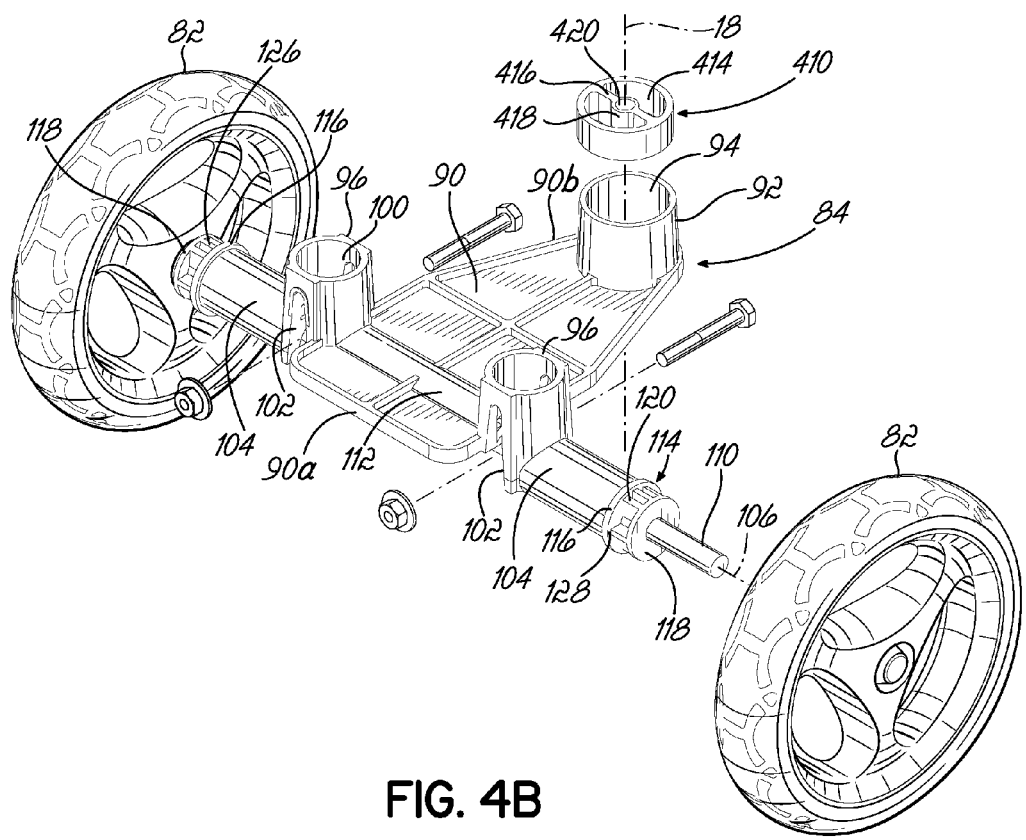
FIG. 4B is a partially disassembled perspective view of a front portion of the scoot-a-bout shown in FIGS. 1 and 2.

Turning now to the front portion 14 of the scoot-a-bout 10, as best shown in FIGS. 1 and 2, front portion 14 carries the front wheels 82 and is configured to rotate relative to rear portion 16 about first pivot axis 18, as illustrated by arrow A, so as to guide or steer the scoot-a-bout 10 in a desired direction. As shown in FIGS. 3 and 4B, the front portion 14 includes a support frame having an interior yoke 84 and an exterior shell 86 configured to, among other functions, cover the yoke 84 and provide a more aesthetic aspect to the scoot-a-bout 10. Additionally, front portion 14 includes a first steering assembly 88, which as discussed in more detail below, may be used to steer the scoot-a-bout 10 when in the ride-on configuration, as shown in FIG. 1.

In reference to FIG. 4B, the interior yoke 84 includes a central plate member 90 having a generally rectangular first portion 90a and a generally triangular portion 90b extending from one edge thereof. The shape of central plate member 90 as described above and shown is exemplary and other shapes may also be suitable. A corner of the second portion 90b includes a tubular extension member 92 extending from an upper surface thereof and defining a passageway 94 through plate member 90. Tubular extension member 92 is configured to align with first pivot axis 18 when the scoot-a-bout 10 is assembled such that passageway 94 is generally parallel to and coaxially disposed about first pivot axis 18.

Central plate member 90 further includes a pair of bosses 96 coupled to opposed side edges of first portion 90a. The bosses 96 may extend above the upper surface of plate member 90 and include a central bore 100 extending through bosses 96 and configured to receive members of the first steering assembly 88 therein, as described in more detail below. The bosses 96 further include a pair of opposed and aligned slots 102, the purpose of which is described below, that penetrate the thickness of the bosses 96 so as to communicate with bore 100.

Each of the bosses 96 includes a cylinder-like axle support tube 104 having one end coupled to a side of the boss 96 (opposite the side that is coupled to the central plate member 90) and extending outwardly therefrom so as to be generally aligned along a wheel axis 106. The axle support tubes 104 define a passageway configured to receive a front axle 110 to which the front wheels 82 are coupled. The support tubes 104 are coupled to bosses 96 such that their passageway is generally below the bottom surface of central plate member 90. In this way, the central plate member 90 does not substantially interfere with the rotation of front axle 110. Alternatively, the underside surface of central plate member 90 may include a depression 112 (seen as a hump in FIG. 4B) along wheel axis 106 configured to receive the front axle 110 therein in a substantially non-interfering manner. In one embodiment, the support tubes 104 may be truncated along a bottom portion thereof so as to be open therealong.

A bearing-like cap 114 closes off the free end of the support tubes 104 and, among other functions, is configured to support the external shell 86 thereon. The cap 114 includes an inner disc 116, an outer disc 118, and an intermediate rib support 120 extending therebetween. Each of these includes a central aperture that defines a passageway through cap 114 configured to receive the front axle 110 therethrough. The inner disc 116 is coupled to the end of the support tube 104 and has a cross dimension (e.g., diameter) that is generally greater than that of the support tube 104. The intermediate rib support 120 includes a plurality of circumferentially spaced, radially-extending ribs 126 coupled to an outer surface of inner disc 116 along one edge thereof. The edge of the ribs 126 do not radially extend to the periphery of the inner disc 116, but instead stop short thereof to define an abutment or shoulder 128. The inner surface of the outer disc 118 is coupled to another edge of ribs 126 and the outer disc 118 may have a cross dimension co-terminus with the outer edge of the ribs 126.

In one embodiment, the yoke 84 may be formed as an integral piece. For example, the yoke 84 may be a molded piece formed from suitable engineering plastics, such as polypropylene, polyethylene or other plastics. However, in alternative embodiments, the various elements may be formed separately and subsequently coupled, such as with various fasteners or bonding processes, for example, to form the yoke 84. The yoke 84 may also be formed from other materials and may be formed from other processes.

Figure 5A:
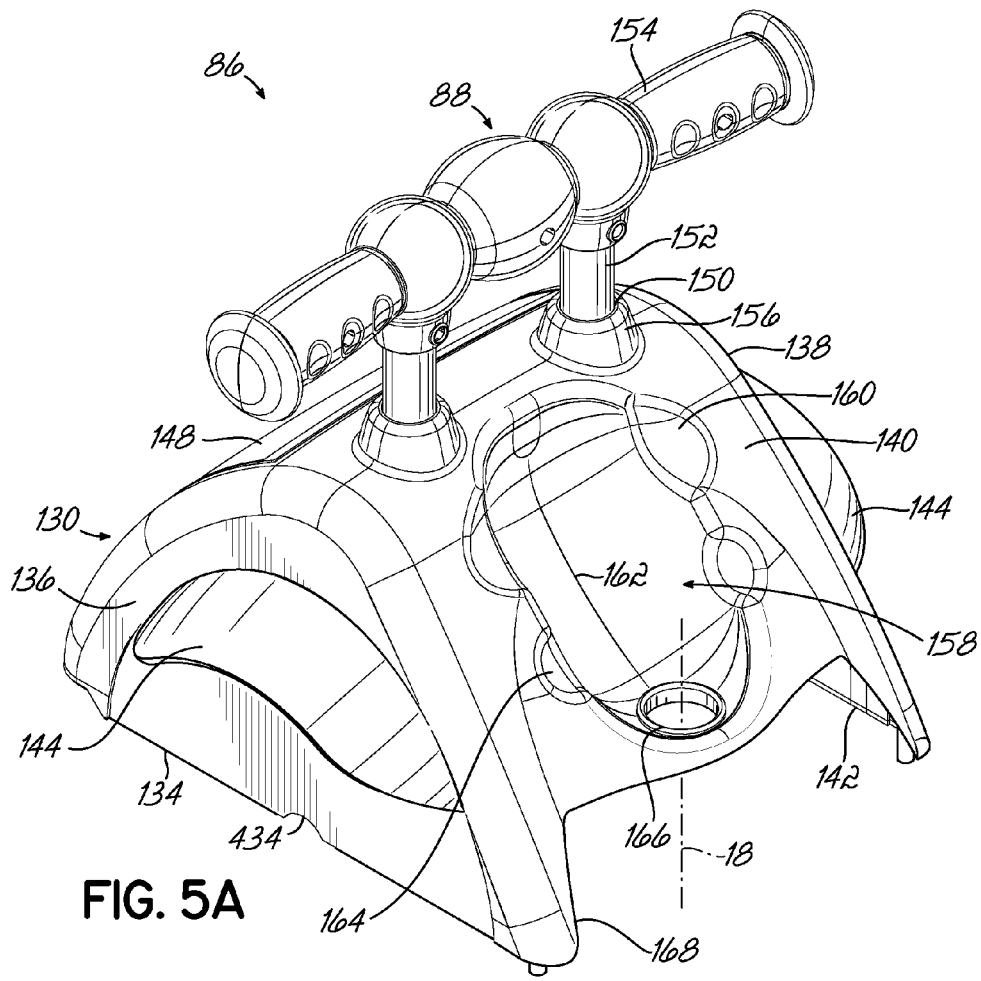
FIG. 5A is a perspective view of the upper shell of the front portion of the scoot-a-bout shown in FIGS. 1 and 2.

In an exemplary embodiment, as shown in FIG. 3, the exterior shell 86 may have a two-piece construction including an upper shell 130 and a lower shell 132 configured to mate with each other along an interface 134. In reference to FIGS. 3 and 5A, the upper shell 130 has an inverted U-shaped configuration having a pair of opposed side walls 136, 138 and a generally arcuate upper wall 140. A bottom 142 of the upper shell 130 is open to provide access to the interior of the upper shell 130. As shown in FIG. 5A, the side walls 136, 138 may include fenders 144 that generally overlie the front wheels 82 and may also provide an aesthetic aspect to the scoot-a-bout 10.

In one embodiment, the arcuate upper wall 140 includes a front cavity 146 (FIGS. 1 and 2) formed therein configured to carry various items according to the desires of the rider. The front cavity 146 may, for example, be configured to receive a removable tray, for carrying the various items which may snap fit within cavity 146 or otherwise couple thereto. Alternatively, the tray may be integrally formed as part of the upper wall 140 of upper shell 130 (not shown). In one embodiment, the front cavity 146 may include a lid or cover 148 movable between an open position, wherein the cavity 146 may be accessed, and a closed position, wherein the lid 148 covers the opening to the cavity 146 and restricts access thereto. The lid 148 may, for example, be hingedly attached to the upper wall 140 to provide for movement between the open and closed positions. The lid 148 may also be coupled to upper wall 140 in other ways.

The upper wall 140 further includes a pair of spaced-apart apertures 150 configured to receive the steering assembly 88 therein. More particularly, as shown in FIG. 3, steering assembly 88 includes a pair of spaced-apart handlebar tubes 152 and a handlebar 154 configured to be grasped by the rider when the scoot-a-bout 10 is in the ride-on configuration, as shown in FIG. 1. The handlebar 154 is configured to couple to the upper end of the handlebar tubes 152, such as by a suitable fastener (e.g., screw, rivet, etc.) and may have a two-piece construction (e.g., a front half and a rear half) which is coupled by a suitable fastener or the like. In this regard, each half of the handlebar 154 may be formed from plastic via a molding process and subsequently mated to form the handlebar 154. However, the handlebar 154 may have other configurations, be formed from other materials, and/or be formed through other suitable processes.

The handlebar tubes 152 extend through the apertures 150 in the upper wall 140 and may be supported therein by bushings 156, which may, for example, be integrally formed with the upper shell 130. To facilitate turning of the scoot-a-bout 10 in a desired direction, the lower end of the handlebar tubes 152 may be securely received in the bore 100 of the bosses 96 of yoke 84, as illustrated in FIG. 3. In this regard, the handlebar tubes 152 may include an opening adjacent the lower end thereof configured to receive a suitable fastener, such as a bolt. The slots 102 in bosses 96 allow the bolt to pass through the bosses 96 and be secured with a nut and thereby secure the steering assembly 88 to the yoke 84.

As shown in FIG. 5A, the upper shell 130 may also include a rear cavity 158 formed therein and configured to receive a portion of the pivot member 12 when the scoot-a-bout 10 is in the scooter configuration, as will be explained in more detail below. The rear cavity 158 includes an upper pair of opposed depressions or wings 160 that communicate with a central portion 162 of rear cavity 158, and a lower pair of opposed depressions or wings 164 that also communicate with the central portion 162 of rear cavity 158. At least one of the central portion 162 and depressions 160, 164 provide a contoured shape configured to receive a portion of pivot member 12 having a similarly contoured shape in a mating, intermeshing relationship, as will be explained below. A lower portion of rear cavity 158 includes an opening or aperture 166 that is configured to align with first pivot axis 18 so as to be coaxially disposed thereabout when the scoot-a-bout 10 is assembled. Additionally, upper shell 130 may further include a cutout 168 adjacent the bottom 142 of upper shell 130 and adjacent the lower portion of rear cavity 158. The cutout 168 may be configured to receive the head portion 60 of the deck 36 when the scoot-a-bout 10 is assembled.

Figure 5B:
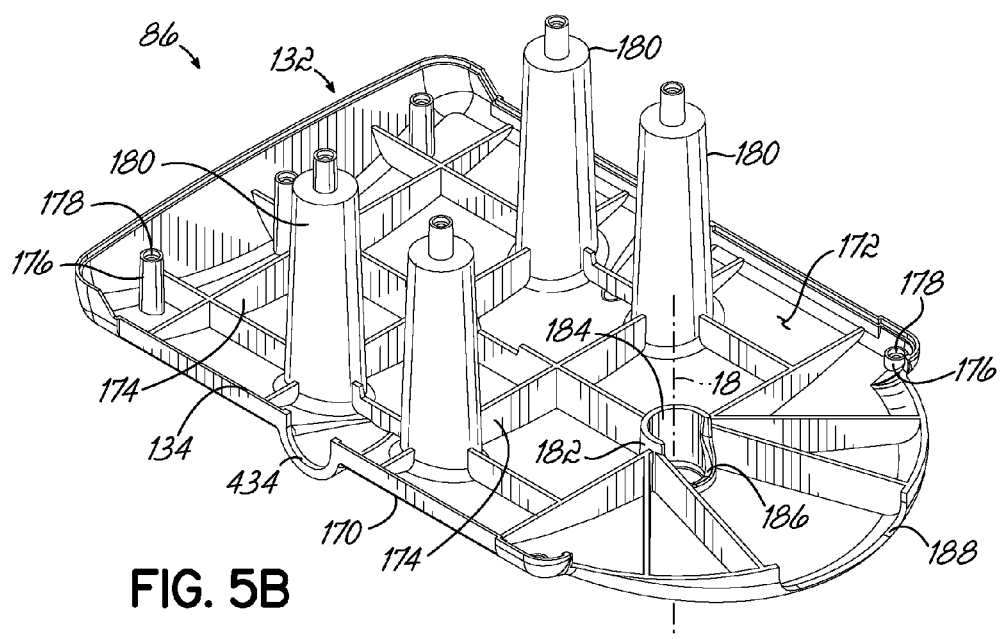
FIG. 5B is a perspective view of the lower shell of the front portion of the scoot-a-bout shown in FIGS. 1 and 2.

As shown in FIGS. 3 and 5B, the lower shell 132 is more plate like in comparison to upper shell 130 and includes a lower surface 170 that may be slightly arcuate and smooth in appearance (not shown). The upper surface 172 may include internal ribbing 174 to provide structural support to lower shell 132. Lower shell 132 further includes a plurality of generally tubular bosses 176 defining bores 178 configured to receive a fastener (e.g., screw or the like) for securing the lower shell 132 to the upper shell 130, such as via similar and corresponding bosses/bores formed on the underside of upper wall 140 (not shown). The corresponding bosses/bores may be arranged generally along the periphery of the upper and lower shells 130, 132 and adjacent interface 134. In addition, however, the lower shell 132 may include a plurality of internal support columns 180 (e.g., four shown) configured to be received within upper shell portion 130 to further facilitate coupling of the upper and lower shells 130, 132. In this regard, the support columns 180 may be generally hollow in construction such that a fastener may be inserted therein, via openings in lower surface 170 (not shown), for example, so as to engage with corresponding receiving bosses/bores (not shown) on the underside of upper wall 140. The support columns 180 provide a coupling between the upper and lower shells 130, 132 at locations other than the periphery of the shells 130, 132 to enhance the structural integrity of front portion 14.

The lower shell 132 further includes a support post 182 adjacent a rear portion thereof and defining a passageway 184 that extends in a direction generally parallel to first pivot axis 18. As explained in more detail below, passageway 184 is configured to receive a lower portion of head tube 30 therein when the scoot-a-bout 10 is assembled. To this end, support post 182 may include an opening or cut out 186 configured to receive a portion of elongate member 22 adjacent first end 24 when the scoot-a-bout 10 is so assembled. Furthermore, a second cut out 188 may be formed along the periphery of lower shell 132 to receive a portion of elongate member 22. In one embodiment, the lower shell 132 may be formed as an integral member from, for example, a molding process using a suitable plastic material. However, embodiments in accordance with the invention are not limited thereto as the lower shell 132 may be formed as separate elements and subsequently coupled together and/or may be formed from other materials and processes.

As best shown in FIGS. 1 and 2, the scoot-a-bout 10 includes a pivot member 12 having a multi-functional role depending on the specific configuration of the scoot-a-bout 10. By way of example, as shown in FIG. 1, when the scoot-a-bout 10 is in the ride-on configuration, the pivot member 12 is in a first, down position and operates as a seat that supports the rider thereon. In contrast, and as shown in FIG. 2, when the scoot-a-bout 10 is in the scooter configuration, the pivot member 12 is in a second, upright position and operates as a steering assembly for guiding the scoot-a-bout 10 in a desired direction. To convert the scoot-a-bout 10 between the two configurations, the pivot member 12 includes pivot joint 20 that allows the pivot member 12 to pivot or rotate between the down and upright positions and relative to the rear portion 16 to which it is coupled. The pivot member 12 and the pivot joint 20 that effectuates this convertibility will now be discussed in greater detail.

Figure 6:
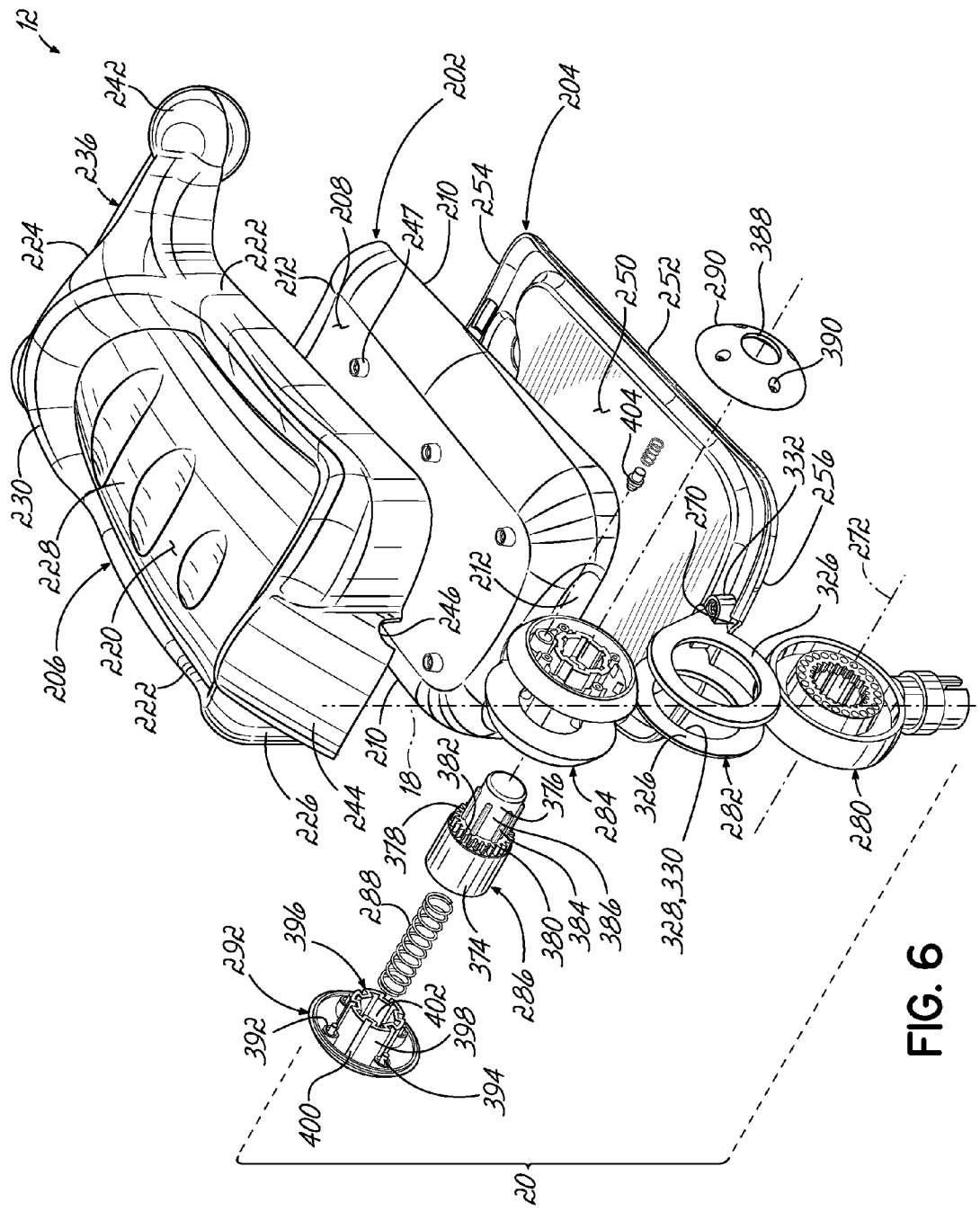
FIG. 6 is a disassembled perspective view of the pivot member and pivot joint of the scoot-a-bout shown in FIGS. 1 and 2.
Figure 7:
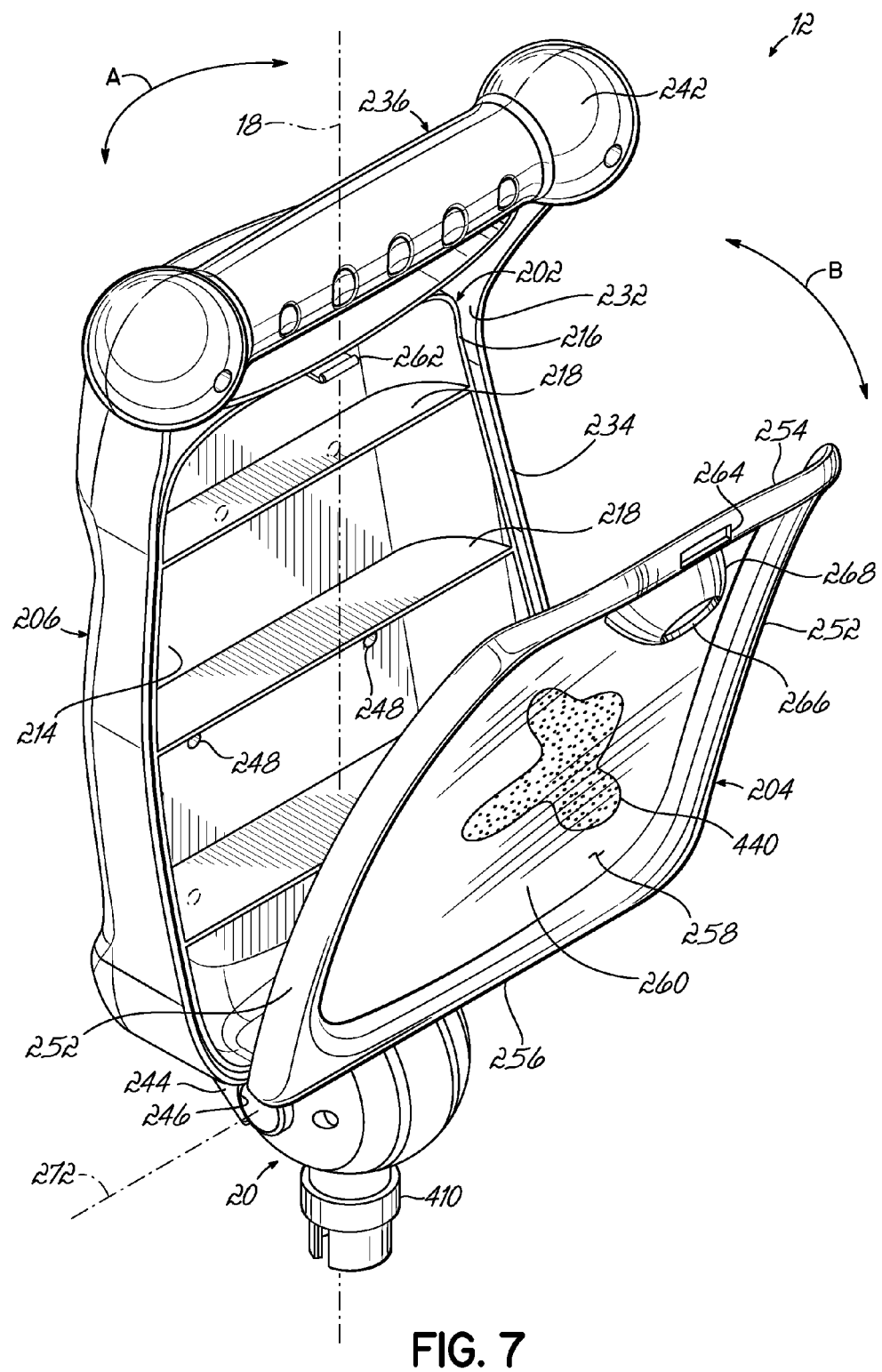
FIG. 7 is an assembled perspective view of the pivot member and pivot joint of the scoot-a-bout shown in FIGS. 1 and 2.

Turning first to the pivot member 12, as shown in FIGS. 6 and 7, the pivot member 12 may include a multi-piece construction having multiple elements coupled together to collectively form the pivot member 12. In this regard, and in an exemplary embodiment, the pivot member 12 may include a main body member 202, a lid member 204 coupled to one side of main body member 202, and a cover member 206 coupled to the other side of main body member 202. In one embodiment, the main body member 202 may be generally rectangular in shape and include a generally planar outer surface 208, a pair of generally opposed sides 210, and a pair of generally opposed ends 212. The transition between the outer surface 208 and the sides and ends 210, 212 may be generally arcuate to provide a smooth transition therebetween as shown.

In one embodiment, and as best illustrated in FIG. 7, the main body member 202 may be generally hollow to define an interior cavity or compartment 214, and an inner side 216 of the main body member 202 may be generally open to provide access to the interior compartment 214. Additionally, the interior compartment 214 may include one or more dividing members 218 that separate the interior compartment 214 into a plurality of bins and/or operate as shelving for items to be contained within the interior compartment 214. The main body member 202 may be molded from suitable engineering plastics, such as polypropylene, polyethylene or other plastics. However, the main body member 202 may be formed from other materials using alternative processes as recognized by those of ordinary skill in the art.

The cover member 206 may likewise be generally rectangular in shape and include an outer surface 220, a pair of generally opposed sides 222, a first end 224 and a second end 226. The outer surface 220 includes a recessed portion 228 that defines a raised ridge 230 about a periphery of the outer surface 220. As shown in FIG. 1, when the scoot-a-bout 10 is in the ride-on configuration, the pivot member 12 operates as a seat for the rider and the outer surface 220 of the cover member 206 provides the surface on which the rider sits. In this regard, the cover member 206, and more particularly the outer surface 220, may be specifically designed to provide aesthetic value while also functionally operating as the sitting surface when the scoot-a-bout 10 is in the ride-on configuration. Similar to the main body member 202, the cover member 206 may be generally hollow to define an interior cavity 232 and an inner side 234 of the cover member 206 may be generally open to provide access to the interior cavity 232. In this regard and as best shown in FIG. 7, when the pivot member 12 is assembled, the main body member 202 is configured to nest within the interior cavity 232 of the cover member 206.

The first end 224 of the cover member 206 includes a second steering assembly 236 for steering the scoot-a-bout 10 when in the scooter configuration, as discussed above and perhaps best shown in FIG. 2. The steering assembly 236 may include a generally U-shaped frame with two upstanding struts 240 (FIG. 2) and a handlebar 242 extending therebetween. In one embodiment, the handlebar 242 may have a two-piece construction (e.g., a front half and a rear half) which is coupled by a suitable fastener (e.g., screw, rivet, etc.). In one embodiment, for example, one half can be integrally formed with the cover member 206 and the other half formed separately and mated thereto to form the handlebar 242. As recognized by those of ordinary skill in the art, the handlebar 242 may have other configurations. In any event, as discussed in more detail below, the second steering assembly 236 is configured to be grasped by the rider when in the scooter configuration so as to turn the scoot-a-bout 10 in a desired direction during use.

The second end 226 of the cover member 206 includes a C-shaped projecting portion 244 projecting outwardly thereof. As will be discussed in more detail below, the projecting portion 244 provides second end 226 with a contoured shape configured to mate with the rear cavity 158 formed in the upper shell 130 of the front portion 14 (FIG. 5A) when the pivot member 12 is in the upright position and the scoot-a-bout 10 is in the scooter configuration. As best illustrated in FIGS. 1 and 7, the projecting portion 244 may also operate as a shield to cover the pivot joint 20 when the pivot member 12 is in the down position and the scoot-a-bout 10 is in the ride-on configuration. For reasons that will become clear from below, the projecting portion 244 includes an arcuate cutout 246 along an edge thereof. In one embodiment, the projecting portion 244 may be integrally formed with the cover member 206. For example, the cover member 206 may be molded from suitable engineering plastics, such as polypropylene, polyethylene or other plastics. However, the cover member 206 may be formed from other materials and other processes, as recognized by those of ordinary skill in the art.

In an exemplary embodiment, the cover member 206 is configured to be fixedly coupled to the main body member 202. In this regard and as shown in FIGS. 6 and 7, the main body member 202 includes at least one, and preferably a plurality of bosses 247 having a bore 248 therethrough. The bores 248 are in communication with the interior compartment 214 of the main body member 202 and can be accessed thereby, as illustrated in FIG. 7. The interior cavity 232 of the cover member 206 includes at least one, and preferably a plurality of bosses having a threaded blind bore formed therein (not shown). When the cover member 206 is coupled to the main body member 202, the threaded bore of the bosses on the surface of the interior cavity 232 of the cover member 206 align with the bores 248 in the bosses 247 in the main body member 202. In this way, a threaded fastener (not shown) may be threaded through both bosses, via the interior compartment 214, for example, to secure the cover member 206 to the main body member 202.

As best shown in FIG. 7, and as discussed in more detail below, the pivot joint 20 allows the lid member 204 to move between an open and closed position relative to the main body member 202. When the lid member 204 is in the open position, the interior compartment 214 of the main body member 202 is accessible. Accordingly, the rider or other person can access various items being stored in the interior compartment 214. In the closed position, however, the lid member 204 engages the main body member 202 so as to cover the opening to the interior compartment 214 and thereby prevent any items stored therein from being removed or falling out of the pivot member 12.

As shown in FIGS. 6 and 7, the lid member 204 may be generally rectangular in shape and have an outer surface 250, a pair of generally opposed sides 252, first and second ends 254, 256, and an inner surface 258 opposite the outer surface 250. In one embodiment, the side and end surfaces may be formed by a turned-down flange or lip along the periphery of the lid member 204. As best shown in FIG. 7, the inner surface 258 of the lid member 204 includes a recessed portion 260 (seen as a raised portion as viewed from outer surface 250) having a generally smooth, planar surface. The lid member 204 may be molded from suitable engineering plastics, such as polypropylene, polyethylene, or other plastics. However, the lid member 204 is not limited thereto and may be formed from other materials and through other processes.

The main body member 202 and lid member 204 may include various features that facilitate opening and closing the lid member 204. In this regard, to secure the lid member 204 in the closed position relative to the main body member 202, the pivot member 12 may include a locking mechanism. In one embodiment, the locking mechanism may include a generally flexible L-shaped finger or latch 262 extending from the upper end 212 of the main body member 202, and a recess 264 formed in the first end 254 of the lid member 204 configured to receive the latch 262 therein. When in the closed position, a lip on the latch 262 engages with an outer surface of the first end wall adjacent the recess 264. When so engaged, movement of the lid member 204 away from the closed position is prohibited. If, however, the rider wants to move the lid member 204 to the open position and access the interior compartment 214, the latch 262 may be resiliently flexed so as to disengage the outer surface of the first end wall and pass back through the recess 264. This releases the lid member 204 from the main body member 202 and allows the lid member 204 to move away from the closed position. Although a latch/recess locking mechanism is disclosed herein, the invention is not so limited as other locking mechanisms may be used to secure the lid member 204 in the closed position.

In addition to the above, the lid member 204 may include a finger hole 266 that facilitates gripping by the rider when he or she wants to move the lid member 204 to the open or closed position. More particularly, the lid member 204, and more particularly the inner surface 258 thereof may include a generally bulbous or spherical projection 268 (a depression as viewed from the outside surface 250) that is truncated by the formation of an open finger hole 266 therethrough. The projection 268 is configured to provide room for the rider's finger (not shown) to hook underneath and pull the lid member 204 away from the main body member 202. Moreover, the lid member 204 may include a cut out 270 in its second end 256 to accommodate the pivot joint 20 when the scoot-a-bout 10 is assembled.

In one aspect in accordance with the invention, the pivot joint 20 is configured to provide pivotal or rotational movement of the pivot member 12 about two pivot axes, which may, for example, be generally orthogonal to each other. More particularly, as illustrated in FIGS. 1, 2 and 7, the pivot joint 20 is configured such that the pivot member 12 is capable of pivoting or rotating relative to a second pivot axis 272. This type of pivotal movement is illustrated by arrow B in these figures. Additionally, however, the pivot joint 20 may be coupled to the scoot-a-bout 10, and more particularly the pivot joint 20 may be coupled to the rear portion 16 thereof so as to allow pivotal or rotational movement of the pivot member 12 relative to the first pivot axis 18 as well. This type of pivotal movement is illustrated by arrow A in FIGS. 1, 2 and 7. As mentioned above, and discussed in more detail below, the pivotal movement of the pivot member 12 relative to the second pivot axis 272 allows the scoot-a-bout 10 to convert between the ride-on configuration and the scooter configuration. The pivotal movement of the pivot member 12 about the first pivot axis 18 provides for steering capability of the scoot-a-bout 10 when the pivot member 12 is in the upright position and scoot-a-bout 10 is in the scooter configuration. The details of the pivot joint 20 will now be discussed. More specifically, the details of pivot joint 20 that provide rotation relative to second pivot axis 272 will be discussed first. A discussion of how the pivot joint 20 is coupled to the scoot-a-bout 10 to provide rotation relative to first pivot axis 18 will then follow.

In an exemplary embodiment, the pivot joint 20 is of a push button design that requires actuation of a push button in order to move the pivot member 12 between various positions relative to second pivot axis 272. As best shown in FIG. 6, the pivot joint 20 includes a main pivot member 280, a first joint connecting member 282, a second joint connecting member 284, a push pin 286, a spring 288, and first and second end caps 290, 292, respectively. As shown in FIG. 7, when these components are assembled, the pivot joint 20 may have a generally spherical configuration.

Figure 10:
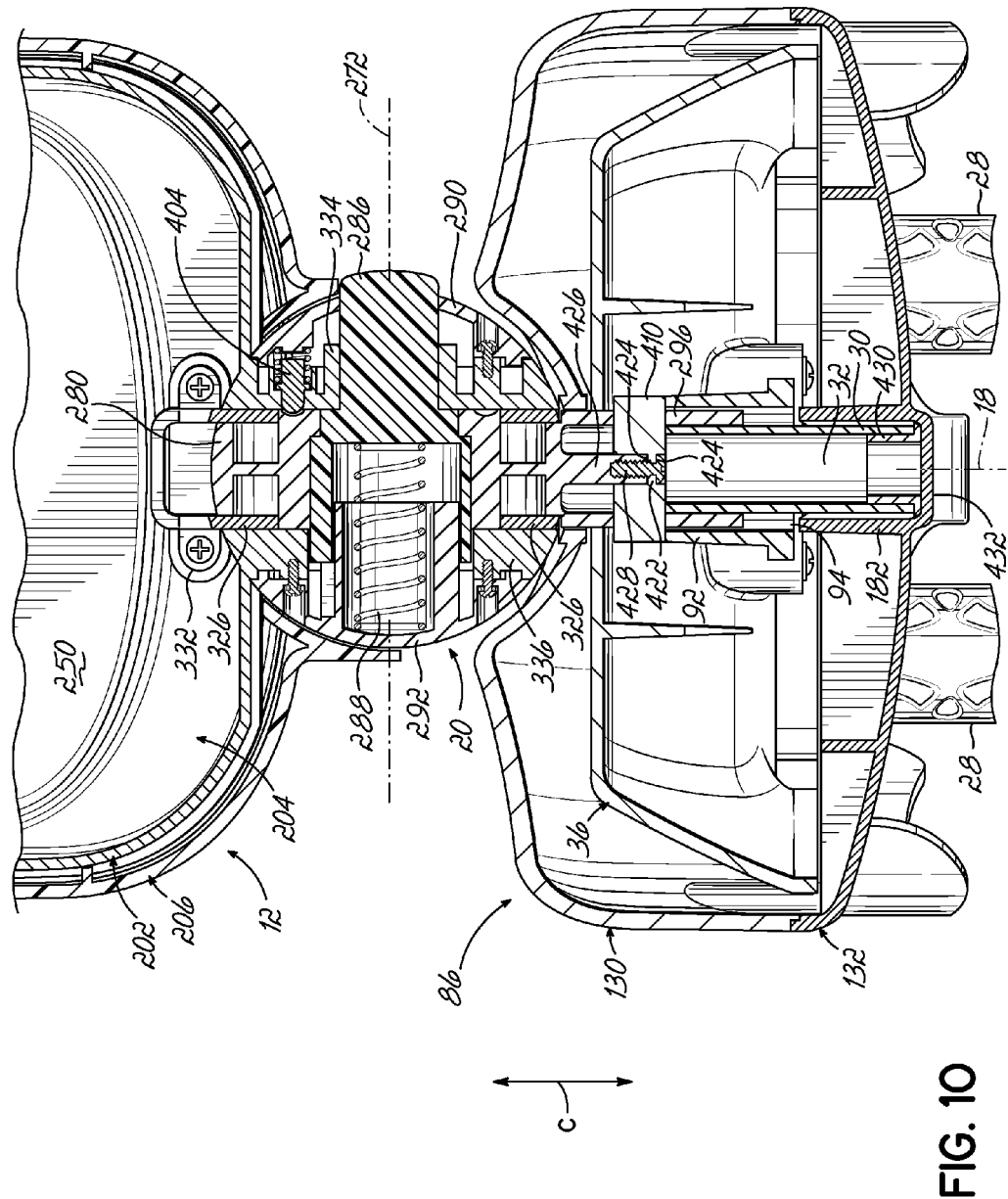
FIG. 10 is a cross-sectional view of the assembled pivot joint of the scoot-a-bout shown in FIGS. 1 and 2.

As best shown in FIGS. 8A and 8B, the main pivot member 280 includes a generally cylindrical head 294 and a stem 296 coupled thereto and extending from an outer surface thereof. The head 294 includes an outer tube 298 and an inner tube 300 coaxially disposed within the outer tube 298, each tube extending in a direction generally parallel to the second pivot axis 272 and coaxially disposed thereabout. The inner and outer tubes 298, 300 are coupled by a centrally located web 302 extending therebetween. The inner tube 300 has a length greater than the outer tube 298 such that a portion of the inner tube 300 extends beyond both ends of the outer tube 298 (FIG. 10). Thus, the outer surface of the inner tube portion 300 includes an exterior outer surface portion 304 that is exposed beyond the ends of the outer tube 298.

A passageway 306 extends through the inner tube 300 and includes features that facilitate operation of the push button pivot joint 20. In this regard, the inner tube 300 includes a radially inwardly directed flange 308 adjacent a first end thereof. The flange 308 divides the passageway 306 into a first passageway portion 310 and a second passageway portion 312, wherein the first passageway portion 310 has a characteristic cross dimension (e.g., diameter) that is generally greater than a characteristic cross dimension of the second passageway portion 312. As best shown in FIG. 8B, the first passageway portion 310 includes a plurality of ribs 314 extending inwardly from an inner wall thereof. The ribs 314 extend in a direction generally parallel to the second pivot axis 272 and may be spaced along the periphery of the first passageway portion 310 (e.g., circumferentially spaced). As discussed below, the ribs 314 may be configured to support the push pin 286 within main pivot member 280.

In a similar manner, the second passageway portion 312 may include a plurality of teeth 318 extending from an inner wall thereof. The teeth 318 extend in a direction generally parallel to the second pivot axis 272 and may be spaced along the periphery of the second passageway portion 312 (e.g., circumferentially spaced). The teeth 318 define corresponding grooves 320 therebetween. In one embodiment, the second passageway portion 312 includes a greater number of teeth 318 and grooves 320 as compared to the number of ribs 314 in the first passageway portion 310. However, other arrangements (e.g., frequency of ribs or teeth) are also possible. In addition to the above, the flange 308 further defines an end face 322 to the inner tube 300. As best shown in FIG. 8A, the end face 322 includes a plurality of bores or depressions 324 spaced along the periphery of the inner tube 300 and radially outward of the second passageway portion 312. As discussed in more detail below, the depressions 324 are configured to cooperate with a spring pin to provide an audible "clicking" sound during pivotal movement of the pivot member 12 relative to the second pivot axis 272.

In reference to FIG. 6, the first joint connecting member 282 of pivot joint 20 includes a pair of generally circular ears 326 each having a central aperture 328 formed therethrough that defines a generally smooth inner edge 330. The ears 326 are spaced from each other in a direction generally parallel to the second pivot axis 272 and when the pivot joint 20 is assembled, the second pivot axis 272 coaxially extends through the central apertures 328 of the ears 326. The ears 326 may include a connecting element 332 for coupling the ears 326 to the lid member 204. More particularly, and as illustrated, the ears 326 may be coupled to the outer surface 250 of the lid member 204 adjacent its second end 256 using a suitable fastener (e.g., screw, rivet, etc.).

Figure 9:
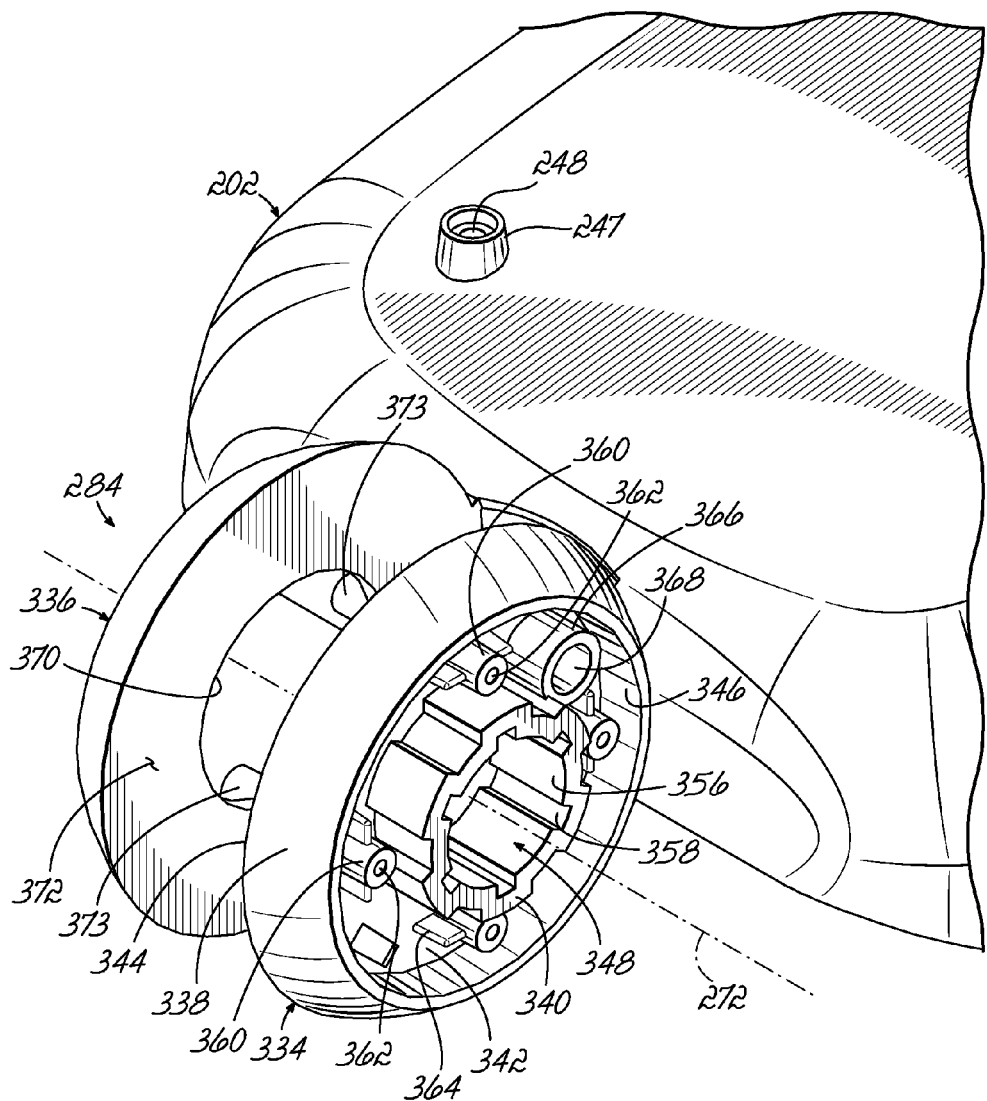
FIG. 9 is a perspective view of another member of the pivot joint.

Turning now to the second joint connecting member 284 of pivot joint 20, as best shown in FIGS. 6 and 9, the second joint connecting member 284 includes a pair of generally circular discs 334, 336 spaced from each other in a direction generally parallel to the second pivot axis 272. The first disc 334 includes an outer tube 338 and an inner tube 340 coaxially disposed within the outer tube 338, each tube extending in a direction generally parallel to the second pivot axis 272. The inner and outer tubes 338, 340 are coupled by a web 342 extending therebetween and located adjacent an inner end of the outer tube 338. In one embodiment, an inner end of the inner tube 340 may be co-terminus with the inner end of the outer tube 338 such that the web 342 and inner ends of the tubes 338, 340 form a flat, generally planar inner surface 344. The outer end of the inner tube 340, however, may extend beyond the outer end of the outer tube 338. The web 342 may be relatively thin as compared to the thickness of the first disc 334 such that a channel or groove 346 may be formed between the inner and outer tubes 340, 338 as viewed from the outer end of the first disc 334 (FIG. 9).

The inner tube 340 includes a passageway 348 that has features that facilitate operation of the push button pivot joint 20. In this regard, the passageway 348 of inner tube 340 includes a plurality of ribs 356 extending from the inner wall thereof. The ribs 356 extend in a direction generally parallel to the second pivot axis 272 and may be spaced along the periphery of the passageway 348. The ribs 356 define corresponding grooves 358 therebetween.

The first disc 334 further includes a plurality of bosses 360 having a threaded bore 362 formed therein and disposed outwardly of and about the inner tube 340 so as to project from the base of channel 346 formed by web 342. The bosses 360 may have support tabs 364 for providing additional strength to the bosses 360. As explained in more detail below, the threaded bores 362 of bosses 360 are configured to receive a screw or other suitable fastener for coupling the first end cap 290 to the pivot joint 20. A tubular member 366 is also positioned in channel 346 outwardly of inner tube 340. The tubular member 366 includes a passageway 368 that is open at the planar inner surface 344 of the first disc 334. The tubular member 366 is configured to receive a spring pin therein that interacts with the depressions 324 for making the audible clicking sound during pivotal movement of the pivot member 12.

The second disc 336 has a more simplified construction as compared to the first disc 334 and includes a central aperture 370 extending through the disc 336 in a direction generally parallel to second pivot axis 272 and coaxially disposed about second pivot axis 272. The aperture 370 may be generally larger than the passageway 348 through the first disc 334 and an inner edge thereof may be generally smooth, lacking any such ribs or grooves as provided on the first disc 334. Similar to the first disc 334, however, the second disc 336 includes an inner surface 372 that is flat and generally planar. Although not entirely shown, an outer surface of disc 336 includes a channel that accommodates a plurality of bosses 373 and threaded bores (not shown), similar to bosses 360 and bores 362, that are disposed outwardly of and about the central aperture 370. The bosses 373 formed on the outer surface of second disc 336 may be used to secure the second end cap 292 to the pivot joint 20 as explained below.

The first and second discs 334, 336 may be coupled to the lower end surface 212 of the main body member 202. By way of example, the discs 334, 336 may be formed from the same material as the main body member 202 and in one embodiment, the discs 334, 336 may be integrally formed therewith during a molding process, for example. Accordingly, the discs 334, 336 may be formed from a suitable engineering plastic. Alternatively, the discs 334, 336 may be formed from other materials. Additionally, in further alternative embodiments, the discs 334, 336 may be separate elements which are subsequently coupled to the main body member 202, such as with suitable fasteners or through a bonding process.

The push pin 286 may be generally cylindrical in shape and include a first pin portion 374 and a second pin portion 376. The first pin portion 374 has an outer cross dimension (e.g., diameter) generally larger than an outer cross dimension of the second pin portion 376 so as to define a juncture therebetween. A sprocket or gear 378 is disposed at the juncture between the first and second pin portions 374, 376 and includes a plurality of teeth 380 that define corresponding grooves 382. The gear 378 is sized such that the teeth 380 do not extend outward of the outer surface of the first pin portion 374. While the outer surface of the first pin portion 374 may be generally smooth, the outer surface of the second pin portion 376 includes a plurality of ribs 384 extending therefrom. The ribs 384 may extend in a direction generally parallel to the second pivot axis 272 and may be spaced about the outer surface of the second pin portion 376 (e.g., circumferentially spaced thereabout). The ribs 384 define corresponding grooves 386 therebetween. As shown in FIG. 6, the ribs 384 do not extend to the end of the second pin portion 376 but stop short thereof. Additionally, the height of the ribs 384 is such as to be below the grooves 382 in gear 378.

In one embodiment, the push pin 286 may be hollow so as to define an internal passageway in at least the first pin portion 374. Although not shown, the internal passageway may include a plurality of ribs extending from the inner wall of the passageway. The ribs may extend in a direction generally parallel to the second pivot axis 272 and may be spaced about the periphery of the passageway. The ribs define corresponding grooves therebetween. In one embodiment, the push pin 286 may be formed from a suitable metal. Alternatively, the push pin 286 may be formed from a suitable engineering plastic such as polypropylene, polyethylene or other suitable materials.

In one embodiment, the first end cap 290 has a generally concave configuration and includes a central aperture 388 coaxially disposed about the second pivot axis 272 when the pivot joint 20 is assembled, and a plurality of through bores 390 disposed outwardly and about the central aperture 388 and configured to receive a fastener therethrough. The second end cap 292 may also have a generally concave configuration in an exemplary embodiment. Unlike the first end cap 290, however, the second end cap 292 has no central aperture and is generally closed as viewed from its outer surface (not shown). But, the second end cap 292 does include a plurality of through bores 392, which may be supported by bosses 394 projecting from an inner surface of the second end cap 292.

A tubular extension member 396 may also project from the inner surface of the second end cap 292, as shown in FIG. 6. In one embodiment, the extension member 396 may be disposed generally inwardly of the through bores 392 and include an outer surface having a plurality of ribs 398 projecting therefrom. The ribs 398 may extend in a direction generally parallel to the second pivot axis 272 and may be spaced along the outer surface in, for example, a generally circumferential direction. The ribs 398 define corresponding grooves 400. The tubular extension member 396 may further include a interior passageway 402 extending therethrough but being closed off by the inner surface of the second end cap 292. The first and second end caps 290, 292 may be formed from a suitable metal, or alternatively, from a suitable engineering plastic.

Assembly of the pivot joint 20 will now be described. The first step is to couple the first joint connecting member 282 to the main pivot member 280. To this end, the ears 326 may be flexed outwardly and away from each other so that the ears 326 may be received on the exterior surface portion 304 of inner tube 300. In this regard, the central aperture 328 through ears 326 is sized so as to be slightly larger than the exterior surface portion 304 of the inner tube 300 and the inner surface of the ears 326 may abut and be supported by the ends of the outer tube 298 of the main pivot member 280. Additionally, when the ears 326 are so coupled, the outer surface of the ears 326 may be generally co-planar with the outer end faces (e.g., end face 322) of the inner tube 300. Moreover, the inner edge 330 of the ears 326 and the surface of the exterior surface portion 304 may be generally smooth such that the ears 326 may rotate relative to the inner tube 300 about second pivot axis 272 with relatively low resistance.

Next, the second joint connecting member 284 may be positioned so as to be coaxially disposed about the second pivot axis 272. In this regard the gap or space between first and second discs 334, 336 is configured to allow the head 294 of main pivot member 280 to be positioned therebetween such that the generally planar inner surfaces of the discs 334, 336 are in abutting or near abutting relationship to the outer end faces of the inner tube 300 of the main pivot member 280. With the second joint connecting member 284 so positioned, the passageway 306 of the main pivot member 280, the passageway 348 of the first disc 334, and the central aperture 370 of the second disc 336 are generally aligned along second pivot axis 272.

With the main pivot member 280, first joint connecting member 282, and the second joint connecting member 284 so arranged, the push pin 286 may be inserted through the various apertures and passageways. In this regard, leading with the second pin portion 376, the push pin 286 is inserted into the central aperture 370 of second disc 336, through the passageway 306 of the main pivot member 280, and through the passageway 348 of the first disc 334. When so positioned, the push pin 286 essentially couples the main pivot member 280 and first and second joint connecting members 282, 284 together.

When the push pin 286 is fully seated through these members, the various ribs and grooves of the pivot joint 20 engage in such a way as to facilitate operation of the pivot joint 20. In this regard, when fully seated, the first pin portion 374 is sized so as to be slightly smaller than the size of the central aperture 370 in second disc 336 so as to be snugly (but movably) received therein. The end of the first pin portion 374 may not project beyond the outer end surface of the second disc 336. The first pin portion 374 also extends into the first passageway portion 310 of passageway 306. The ribs 314 in first passageway portion 310 do not mesh or interlock with any features on the first pin portion 374, but merely operate as support ribs to support the push pin 286 within the main pivot member 280. In this regard, an inner surface of the ribs 314 may abut or nearly abut the outer surface of the first pin portion 374.

When the push pin 286 is fully seated, the gear 378 may be positioned within the second passageway portion 312 of passageway 306 in main pivot member 280. More particularly, the teeth 380 and grooves 382 on gear 378 are configured to be snugly received in the grooves 320 and teeth 318 of second passageway portion 312, respectively. When so engaged, relative rotation between the push pin 286 and the main pivot member 280 is prohibited.

In a similar manner, when the push pin 286 is fully seated, the second pin portion 376 is disposed in the passageway 348 of the first disc 334. More particularly, ribs 384 and grooves 386 on the outer surface of the second pin portion 376 are configured to be snugly received in the grooves 358 and ribs 356 of the passageway 348 through the inner tube 340 of the first disc 334, respectively. When so engaged, relative rotation between the push pin 286 and the second joint connecting member 284 (and therefore the main body member 202 of pivot member 12) is prohibited. As can be appreciated, the free end of the second pin portion 376 projects beyond the outer surface of the first disc 334 when the push pin 286 is fully seated.

With the push pin 286 fully seated, the assembly of the pivot joint 20 may be completed. In this regard, one end of the spring 288 may be inserted into the internal passageway of the first pin portion 374 (FIG. 10) and the other end of the spring 288 may be inserted into the interior passageway 402 of the tubular extension member 396 of second end cap 292. As the second end cap 292 is moved toward the pivot joint 20, the tubular extension member 396 enters the interior passageway of the first pin portion 374. More particularly, the ribs 398 and grooves 400 on the extension member 396 are configured to be snugly received within the grooves and ribs formed in the interior passageway of the first pin portion 374 (FIG. 10). When so engaged, relative rotation between the push pin 286 and the second end cap 292 is prohibited. Fasteners, such as screws or the like, may be inserted through bores 392 so as to engage the threaded bores in bosses 373 on the outer surface of the second disc 336 and thereby secure the second end cap 292 to the pivot joint 20.

The spring 288 biases the push pin 286 toward its fully seated position such that the push pin 286 has the relationship with the structure of the main pivot member 280 and first and second joint connecting members 282, 284 as discussed above. The travel of the push pin 286 as a result of the bias from spring 288 is limited by a stop. In this regard, when the push pin 286 is in its fully seated position, an inner end face of the gear 378 is configured to engage the generally planar inner surface 344 of the first disc 334, thereby prohibiting any further movement of the push pin 286 away from second end cap 292.

Lastly, the first end cap 290 may be coupled to the pivot joint 20. Before doing so, however, a spring biased pin 404 may be inserted into the passageway 368 of tubular member 366 on first disc 334. The inner surface of the first end cap 290 may also include a boss or tubular member configured to receive an opposing end of the spring (not shown). When assembled, the spring pin 404 aligns with the depressions 324 formed in the end face 322 of main pivot member 280. As mentioned above, the interaction between the spring pin 404 and the depressions 324 provide an audible clicking sound as the pivot member 12 is being rotated about the second pivot axis 272. Fasteners, such as screws or the like, may be inserted through bores 390 so as to engage the threaded bores 362 in bosses 360 on the outer surface of the first disc 334 (FIG. 9) and thereby secure the first end cap 290 to the pivot joint 20. An end of the push pin 286 projects through the central aperture 388 of the first end cap 290 so that a rider or other person may push the pin 286 and pivot the pivot member 12, as will now be explained.

In operation, when the push pin 286 is in its fully seated position, the main body member 202, and therefore the pivot member 12, is prohibited from rotating relative to the main pivot member 280 about second pivot axis 272, due to the interactions of the ribs/grooves or teeth/grooves, as explained above. This effectively defines a locked position of the pivot member 12. However, when the push pin 286 is pushed inwardly, the various intermeshing features are released thereby allowing the main body member 202, and therefore the pivot member 12, to rotate relative to the main pivot member 280 about second pivot axis 272. This effectively defines an unlocked position of the pivot member 12 and allows the pivot member 12 to be rotated about the second pivot axis 272.

More particularly, when the push pin 286 is pushed inwardly against the bias of spring 288, the gear 378 moves out of the second passageway portion 312 and into the larger first passageway portion 310. As the ribs 314 in the first passageway portion 310 are outward of the outer surface of the first pin portion 374, the ribs 314 are also outward of the gear 378 such that the ribs 314 and gear 378 do not engage each other. In a similar manner, when the push pin 286 is pushed inwardly, a portion of the second pin portion 376 moves into the second passageway portion 312 of the main pivot member 280. However, the second pin portion 376 is sized such that the ribs 384 on the outer surface thereof do not engage the teeth 318 or grooves 320 of the second passageway portion 312. In this way, the push pin 286 is no longer locked to the main pivot member 280 and the push pin 286 may rotate relative thereto about the second pivot axis 272.

It should be realized, however, that when the push pin 286 is pushed inwardly, such that the gear 378 disengages the second passageway portion 312, the ribs 384 and grooves 386 on the outer surface of the second pin portion 376 remain engaged with the grooves 358 and ribs 356 formed in passageway 348 of the first disc 334. Thus, relative rotation between the push pin 286 and main body member 202 (and thus pivot member 12) is prohibited, and these remain rotationally coupled. In this way, rotation of the pivot member 12 about second pivot axis 272 also rotates the push pin 286. When the push pin 286 is released, the bias of the spring 288 moves the push pin 286 back to its fully seated position thereby prohibiting rotation of the pivot member 12 relative to the main pivot member 280 about second pivot axis 272 (i.e., relocking the pivot member). The number of pre-defined locked positions of the pivot member 12 relative to the main pivot member 280 may be determined at least in part by the number of teeth 318 and grooves 320 formed in the second passageway portion 312 of the main pivot member 280. It should be realized that these may be adjusted in number to meet the desires of a specific application.

In another aspect in accordance with the invention, the pivot joint 20 may be configured to couple to the scoot-a-bout 10 in a manner that allows the pivot member 12 the capability of rotating relative to the first pivot axis 18. This aspect as well as the assembly of the front and rear portions 14, 16 of scoot-a-bout 10, will now be described in reference to FIGS. 3 and 10. In this regard, the yoke 84 is coupled to elongate member 22 by inserting the upper end of the head tube 30 into the passageway 46 of tubular extension member 92 from below. Such a coupling at least in part allows the front portion 14 to rotate relative to rear portion 16 about first pivot axis 18. Next, the stem 296 of the main pivot member 280 is inserted first through the aperture 166 in the upper shell 130 and then through the aperture 80 in the head portion 60 of the deck 36. The head portion 60 fits inside of the upper shell 130 and a portion thereof extends through the cutout 168.

As shown in FIGS. 3 and 4B, a retainer washer 410 may be positioned on the upper end face of the tubular extension member 92 of the yoke 84 so as to be supported thereby. The stem 296 of the main pivot member 280 may then be inserted through the retainer washer 410 and the tubular extension member 92 of yoke 84. The retaining washer 410 may be configured to rotatably couple the pivot member 12 to the scoot-a-bout 10, as well as to support the pivot member 12 thereon. To facilitate the coupling and support of the pivot member 12 to the scoot-a-bout 10 in one embodiment, the stem 296 may include a pair of generally opposed slots 412 (FIGS. 8A and 8B) formed through the wall thereof and extending in a direction generally parallel to the first pivot axis 18. The opposed slots 412 are aligned so as to be generally parallel to the second pivot axis 272. Additionally, the retaining washer 410 includes a passageway 414 having a web 416 spanning its diameter. The web 416 includes a central tube 418 having a passageway 420 extending in a direction generally parallel to the first pivot axis 18 and coaxially disposed thereabout. A ring member 422 (FIG. 10) is disposed within the passageway 420 and defines a reduced passageway portion and two generally opposed abutments 424. The retainer washer 410 may be formed from metal or a suitable engineering plastic, such as through a molding process. Other materials and processes may also be used, however.

The stem 296 is inserted through the retaining washer 410 such that the web 416 is received in slots 412, as can be appreciated from FIG. 3. When fully inserted, the web 416 may engage the closed ends of the slots 412 and thereby support the pivot member 12 thereon. As shown in FIG. 10, the stem 296 fits inside the passageway 94 of tubular extension member 92 so as to be generally disposed between the passageway 94 and the head tube 30 of elongate member 22 when assembled.

As previously mentioned, the pivot member 12 may be coupled to the rear portion 16 of the scoot-a-bout 10, and more particularly, to the deck 36 thereof. To this end, and as illustrated best in FIG. 10, the stem 296 includes an interior, centrally located post 426 having a threaded bore 428 formed therein. When the stem 296 is fully inserted in the retaining washer 410, the end of the post 426 may be disposed within the passageway 420 of the central tube 418 so as to engage one of the abutments 424 formed by ring member 422. A screw or other suitable fastener may then be inserted through the lower opening of passageway 32 of head tube 30 so as to couple the retaining washer 410 to the post 426 (and consequently to the pivot member 12). The coupling may be protected from dirt, water, and other debris by inserting an elastomeric plug 430 in the lower opening of head tube 30. The plug 430 also provides a softer, less harsh abutment surface for engaging the lower shell 132 as explained below. As also explained below, the plug 430 may facilitate relative rotation between the head tube 30 (i.e., rear portion 16) and lower shell 132 (i.e., front portion 14).

Through this coupling, movement of the pivot member 12 relative to the deck 36 and rear portion 16 in a direction generally parallel to the first pivot axis 18 is prohibited, as illustrated by arrow C in FIG. 10. In this regard, any attempted movement of the pivot member 12 relative to the deck 36 downwardly (e.g., toward the ground) is prohibited by the engagement of the ends of the slots 412 with the web 416. Of course, the retaining washer 410 is supported by the upper end face of the tubular extension member 92 and therefore cannot move downwardly either.

Similarly, any attempted movement of the pivot member 12 upwardly (e.g., away from the ground) relative to the deck 36 is also prohibited. To this end, the size of the retaining washer 410 is generally larger than the aperture 80 in the head portion 60 of the deck 36. Thus, upward movement of the pivot member 12 relative to the deck 36, causes the retaining washer 410 to engage the underside of the deck 36 adjacent the aperture 80. This engagement prohibits any appreciable upward movement of the pivot member 12 relative to the deck 36.

To complete the assembly, the head tube 30 may be inserted into the passageway 184 of support post 182 in the lower shell 132 such that, for example, the plug 430 engages and is supported by a closed end 432 of the support post 182. The softer material of plug 430 may be configured to reduce damage and wear between the head tube 30 and the lower shell 132 as a result of use. The lower shell 132 may then be coupled to the upper shell 130 as explained above. The loads imposed on the rear portion 16 are accommodated at least in part by the front portion 14. More particularly, the vertical loads on head tube 30 are counteracted by its engagement with the lower shell 132. The loads on the lower shell 132 are, in turn, counteracted by its engagement with the upper shell 130 and with yoke 84.

In this regard, when the upper and lower shells 130, 132 are coupled together, they clamp about the caps 114 on the outer end of the support tubes 104 of the yoke 84. For example, the upper and lower shells 130, 132 may include arcuate cutouts 434 (FIG. 3) that clamp about the rib support 120 of the caps 114 (FIG. 4B). Lateral movement of the yoke 84 relative to the exterior shell 86 in a direction generally parallel to the second pivot axis 272 is prohibited by an interaction between the cap 114 and the shell 86. More particularly, any such lateral movement causes the shoulder 128 to contact the inner surface of the upper and lower shells 130, 132 thereby substantially prohibiting any such movement. By this coupling, the loads on the head tube 30 are transferred to the shell 86, which are transferred to the yoke 84, which are then transferred to the front axle 110, and ultimately counteracted by front wheels 82 engaging the ground.

In a further aspect of the invention, it should be realized that while the coupling of the pivot member 12 to the scoot-a-bout 10, as described above, prohibits any substantial relative movement between the pivot member 12 and the deck 36 in a direction generally parallel to the first pivot axis 18 (e.g., vertically), the coupling does allow for relative rotational movement therebetween. In this regard, if the pivot member 12 is rotated about the first pivot axis 18, the stem 296 and the retaining washer 410, which would rotate with rotation of the pivot member 12, are capable of rotating about first pivot axis 18 relative to the surrounding structure and without significant restrictions therefrom. Thus, the pivot member 12 is capable of pivoting about second pivot axis 272, and the pivot member 12 and pivot joint 20 are collectively capable of rotating about first pivot axis 18. As explained below, such a design allows the scoot-a-bout 10 to be steerable in the scooter configuration.

In use, and for purposes of description, starting from the ride-on configuration shown in FIG. 1, a child would mount the scoot-a-bout 10 by straddling the scoot-a-bout 10 or by throwing a leg over one side thereof and sitting on the outer surface 220 of the pivot member 12. When seated, the feet of the child are configured to touch the ground and the rider's hands are configured to grasp the handlebar 154 of the first steering assembly 88. Through a scooting action of the rider's feet, the rider is able to propel the scoot-a-bout 10 in a direction dictated by the handlebar 154. If the rider desires to change directions, the rider may turn the handlebar 154 in a clockwise or counterclockwise direction. Because the front portion 14 is capable of rotating about first pivot axis 18 relative to the rear portion 16, the front wheels 82 of the scoot-a-bout 10 change direction and guide the scoot-a-bout 10 in the desired direction.

When the pivot member 12 is in the down position for the ride-on configuration, the pivot member 12 is in a locked position and is prohibited from rotating relative to the second pivot axis 272, as explained above. However, the pivot member 12 (and pivot joint 20) still remains capable of rotating about the first pivot axis 18. However, the scoot-a-bout 10 may be configured to limit such rotation about the first pivot axis 18 when in the ride-on configuration. In this regard, when the pivot member 12 is in the down position, the handlebar 242 of the second steering assembly 236 may be configured to be seated in the depression 72 in the fender portion 64 of the deck 36. The handlebar 242 may be configured such that any rotation of the pivot member 12 about the first pivot axis 18 would cause a portion of the handlebar 242 (e.g., enlarged ball portions as shown in FIGS. 1 and 3) to contact the sides of the fender portion 64 and therefore limit any such rotation.

If the child desires to convert the scoot-a-bout 10 to the scooter configuration, the child or his or her parents or guardian presses the push pin 286 that is projecting from the end cap 290 inwardly thereby releasing the locking mechanism and allowing the pivot member 12 to be rotated about the second pivot axis 272 to its upright position, as shown in FIG. 2. As discussed above, the pivot member 12 may be configured to relock when in the upright position. In addition to the pivot joint 20 locking the pivot member 12 in the upright position, the scoot-a-bout 10 may include a secondary locking mechanism to secure the pivot member 12 in the upright position (not shown). For example, in one embodiment, the pivot member 12 may include a recess or cutout in the cover member 206 that cooperates with a spring-loaded latch on, for example, the handlebar 154 of the first steering assembly 88 to further secure the pivot member 12 in the upright position. Additionally, a release button may be provided on the handlebar 154 to release the latch from the cutout when it is desired to move the pivot member 12 back toward the down position. In any event, when the pivot member 12 is in the upright position, the deck 36 is exposed to support one or both feet of the rider and the second steering assembly 236 is appropriately positioned to be grasped by the user. In this regard, a child would grasp the handlebar 242, place one foot on the deck 36, and push off the ground with the other foot to propel the scoot-a-bout 10 in a direction dictated by handlebar 242.

Unlike other conventional convertible devices, however, the scoot-a-bout 10 in accordance with the invention is configured to be steerable when in the scooter configuration. Thus, if the rider desires to change directions, the rider may turn the handlebar 242 in a clockwise or counterclockwise direction about the first pivot axis 18 and guide the scoot-a-bout 10 in the desired direction. In this regard, when the pivot member 12 is in the upright position, the projecting portion 244 on the second end 226 of the cover member 206 (FIG. 6) is snugly received within the rear cavity 158 of the upper shell 130 (FIG. 5A). Through this interaction, rotation of the pivot member 12 about the first pivot axis 18 causes a corresponding rotation in the exterior shell 86, and thus the front portion 14, relative to the rear portion 16. Of course rotating the front portion 14 causes the front wheels 82 to change direction and guide the scoot-a-bout 10 in the desired direction.

As discussed above, children often have a strong desire to customize their possessions to express individuality and personality, and conventional bikes, scooters, trikes and other child vehicles may not offer much, if any, potential for customization. To address such a shortcoming in the industry, and in accordance with a further aspect of the invention, the scoot-a-bout 10 may be configured to allow customization through artistic expression. More particularly, the scoot-a-bout 10 may include one or more graphical interfaces 440 that allow a child to mark thereon using a wide variety of writing or marking utensils. For example, the graphical interfaces 440 may be configured to be marked on using, without limitation, pencils, pens, markers, chalk, water-color paints, crayons and possibly other marking utensils. Such marking utensils can be readily purchased from a wide variety of retail outlets. By way of example, marking utensils offered by Crayola, LLC of Easton, Pa. may be used to mark on the graphical interfaces 440. This may include, without limitation, Crayola® crayons, washable markers, sidewalk chalk and sidewalk crayons.

Other manufacturers may also provide marking utensils that can be used to mark on the graphical interfaces 440. Such marking utensils may be stored or carried in the front cavity 146 and/or compartment 214 in pivot member 12.

The graphical interfaces 440 may be located on several surfaces of the scoot-a-bout 10. By way of example, a graphical interface 440 may be positioned on the outer surface of the lid 148 that covers the front cavity 146. Additionally or alternatively, a graphical interface 440 may be positioned on the upper surface 66 of the deck 36. Still further, a graphical interface 440 may be provided on the inner surface 258 of the lid member 204 (FIG. 7). It should be recognized that graphical interfaces 440 may be positioned at other locations on the scoot-a-bout 10. It should also be recognized that the inclusion of a graphical interface on a child vehicle is not limited to the scoot-a-bout 10 shown and described herein. In this regard, assignee's co-pending U.S. application Ser. No. 12/706,578, filed on Feb. 16, 2010 and entitled "Child Vehicle Having a Graphical Interface", the disclosure of which is incorporated by reference herein in its entirety, discloses graphical interfaces on a convertible trike and bike.

The graphical interfaces 440 may be integrally formed with the member on which it is positioned. For example, a graphical interface 440 may be formed from the plastic that forms the member (e.g., lid 148, deck 36, or lid member 204). The plastic may be configured during manufacturing to facilitate marking on the graphical interface 440. In one embodiment, for example, the graphical interface 440 may include a matte finish that provides a sufficient surface roughness that allows the material of the marking utensil (e.g., pencil, chalk, crayons, etc.) to be deposited thereon when the utensil is in moving contact therewith. In addition to the above, the graphical interface 440 may also be configured in a manner that facilitates removal of the markings thereon. In this regard, and in a further embodiment, the graphical interface 440 may be formed from a surface of an art board integrated within scoot-a-bout 10. Such art boards include, without limitation, dry erase boards, chalk boards, paint boards, and other boards suitable for drawing, coloring, painting, or otherwise marking thereon for creating an artistic expression.

In an alternative embodiment, the graphical interface 440 may include a substrate that is removably coupled to the scoot-a-bout 10. The substrate may be marked on prior to coupling to the scoot-a-bout 10 or marked on after being coupled to the scoot-a-bout 10. By way of example, the substrate may be an art board, as described above, removably coupled to the scoot-a-bout 10. The substrate may be a plastic member having a sufficient surface roughness. The substrate may also include most any paper used by children for drawing or coloring and may include, for example, notebook paper, construction paper, or a specialty paper, such as Crayola® Color Wonder, Color Explosion, or Color Surge paper. Other specialty papers from Crayola® or other manufacturers may also be used in accordance with this aspect of the invention. Other substrates, such as poster board or other cardboard materials may also be used. In this embodiment, the substrate may be coupled to the scoot-a-bout 10 through various means including, for example, providing a clip adjacent the graphical interface 440 for retaining the substrate thereto. Other techniques, such as tape, glues, magnets, etc. may also be used to retain the substrate to the scoot-a-bout 10.

The inclusion of one or more graphical interfaces 440 on the scoot-a-bout 10 allows a child to assert their individuality by personalization of the scoot-a-bout 10. This personalization may be achieved through the child's artistic expression. It is believed that personalizing the scoot-a-bout 10 in this manner will enhance the enjoyment experienced by the child though interacting with the scoot-a-bout 10. Additionally, the graphical interfaces 440 increase the number of activities a child may do using the scoot-a-bout 10. Thus, in addition to riding the scoot-a-bout 10 in either configuration, a child may also use the scoot-a-bout 10 to draw, color, paint, etc. and explore the limits of his or her imagination.

While the present invention has been illustrated by a description of various preferred embodiments and while these embodiments have been described in some detail, it is not the intention of the inventor to restrict or in any way limit the scope of the appended claims to such detail. Additional advantages and modifications will readily appear to those skilled in the art. Thus, the various features of the invention may be used alone or in any combination depending on the needs and preferences of the user.

What is claimed is:

1. A child vehicle, comprising:
 a front portion having at least one front wheel coupled thereto and a first handlebar operatively configured to change the direction of the at least one front wheel;
 a rear portion coupled to the front portion and having at least one rear wheel coupled thereto, the front portion capable of rotating relative to the rear portion about a first pivot axis;
 a pivot joint coupled to the vehicle;
 a pivot member coupled to the pivot joint, the pivot joint operatively configured to provide rotation of the pivot member relative to the vehicle between at least a first position and a second position about a second pivot axis, the pivot member operating as a seat for supporting a rider thereon when in the first position to define a ride-on configuration of the vehicle, and the pivot member operating as a handlebar when in the second position to define a scooter configuration of the vehicle,
 wherein the first pivot axis and the second pivot axis intersect one another.

2. The child vehicle of claim 1, wherein the pivot joint includes a push button, the pivot member being movable between the first and second positions when the push button is depressed, and the pivot member being prohibited from rotating about the second pivot axis when the push button is not depressed.

3. The child vehicle of claim 1, wherein the first pivot axis and the second pivot axis are generally orthogonal to each other.

4. The child vehicle of claim 1, wherein the pivot joint is capable of rotating relative to the vehicle about the first pivot axis.

5. The child vehicle of claim 4, wherein the pivot member engages the rear portion of the vehicle so as to limit rotation of the pivot member relative to the vehicle about the first pivot axis when the pivot member is in the first position.

6. The child vehicle of claim 4, wherein the pivot member includes a second handlebar operatively configured to change the direction of the at least one front wheel when the pivot member is in the second position.

7. The child vehicle of claim 1, wherein the pivot member includes a compartment for storing items.

8. The child vehicle of claim 7, wherein the pivot member comprises:
 a main body member coupled to the pivot joint and defining the compartment; and
 a lid member coupled to the pivot joint and rotatable relative to the main body member between an open position, wherein the compartment is accessible, and a closed position, wherein the compartment is inaccessible.

9. The child vehicle of claim 8, further comprising a cover member fixedly coupled to the main body member and having a second handlebar.

10. A child vehicle, comprising:
a front portion having at least one front wheel coupled thereto;
a rear portion coupled to the front portion and having at least one rear wheel coupled thereto, the front portion capable of rotating relative to the rear portion about a first pivot axis;
a pivot joint coupled to the vehicle so as to be rotatable about the first pivot axis;
a pivot member coupled to the pivot joint, the pivot joint operatively configured to provide rotation of the pivot member relative to the vehicle about a second pivot axis to define at least a first position and a second position of the pivot member;
a first handlebar coupled to the front portion and operatively configured to change the direction of the at least one front wheel;
a second handlebar coupled to the pivot member, wherein the second handlebar is operatively configured to change the direction of the at least one front wheel when the pivot member is in the second position, and operatively ineffective to change the direction of the at least one front wheel when the pivot member is in the first position.

11. The child vehicle of claim 10, wherein the first pivot axis and the second pivot axis are generally orthogonal to each other.

12. The child vehicle of claim 10, wherein the first pivot axis and the second pivot axis intersect one another.

13. The child vehicle of claim 10, wherein the front portion includes a recess having a first shape and the pivot member includes a projection having a shape corresponding to the first shape, wherein when the pivot member is in the second position, the projection engages the recess such that rotation of the pivot member about the first pivot axis causes a corresponding rotation of the front portion relative to the rear portion about the first pivot axis.

14. The child vehicle of claim 10, wherein the pivot member engages the rear portion of the vehicle so as to limit rotation of the pivot member relative to the vehicle about the first pivot axis when the pivot member is in the first position.

15. A child vehicle, comprising:
a front portion having at least one front wheel coupled thereto;
a rear portion coupled to the front portion and having at least one rear wheel coupled thereto, the front portion capable of rotating relative to the rear portion about a first pivot axis;
a pivot member coupled to the vehicle so as to be rotatable about the first pivot axis and a second pivot axis, rotation solely about the second pivot axis defining at least a first position and a second position of the pivot member, the pivot member operating as a seat for supporting a rider thereon when in the first position to define a ride-on configuration of the vehicle, the pivot member operating as a handlebar when in the second position to define a scooter configuration of the vehicle, and the pivot member operatively configured to change the direction of the at least one front wheel when in the second position.

16. A child vehicle, comprising:
a front portion having at least one front wheel coupled thereto;
a rear portion coupled to the front portion and having at least one rear wheel coupled thereto, the front portion capable of rotating relative to the rear portion about a first pivot axis;
a pivot member coupled to the vehicle so as to be rotatable about a second pivot axis between at least a first position and a second position, the pivot member operating as a seat for supporting a rider thereon when in the first position to define a ride-on configuration of the vehicle, the pivot member operating as a handlebar when in the second position to define a scooter configuration of the vehicle;
a push button coupled to the pivot member, the pivot member being movable between the first and second positions when the push button is depressed, and the pivot member being prohibited from rotating about the second pivot axis when the push button is not depressed; and
at least one graphical interface coupled to the vehicle and configured to be marked on by a marking utensil.

17. The child vehicle of claim 16, wherein the graphical interface is integrally formed on an exposed surface of the vehicle.

18. The child vehicle of claim 17, wherein the graphical interface includes a surface roughness sufficient to allow a marking utensil to mark thereon when in movable contact therewith.

19. The child vehicle of claim 16, further comprising a substrate removably coupled to the vehicle, the substrate defining the graphical interface.

\* \* \* \* \*